(12) United States Patent
Afshar et al.

(10) Patent No.: US 11,049,414 B2
(45) Date of Patent: Jun. 29, 2021

(54) TILE INSTRUCTIONAL SYSTEMS AND METHODS OF MAKING AND USING SAME

(71) Applicant: Brainquake Inc., Petaluma, CA (US)

(72) Inventors: Dariush Afshar, Campbell, CA (US); Pamela Briskman, Oakland, CA (US); Keith Devlin, Petaluma, CA (US); Steve Mays, San Rafael, CA (US); Michael Romero, San Jose, CA (US); Randy Weiner, Oakland, CA (US)

(73) Assignee: BrainQuake Inc, Petaluma, CA (US)

( * ) Notice: Subject to any disclaimer, the term of this patent is extended or adjusted under 35 U.S.C. 154(b) by 460 days.

(21) Appl. No.: 16/140,372

(22) Filed: Sep. 24, 2018

(65) Prior Publication Data

US 2019/0096283 A1    Mar. 28, 2019

Related U.S. Application Data

(63) Continuation-in-part of application No. 16/137,151, filed on Sep. 20, 2018, which is a continuation-in-part of application No. 15/939,153, filed on Mar. 28, 2018, now Pat. No. 10,186,159, which is a continuation-in-part of application No. 15/369,699, filed on Dec. 5, 2016, now abandoned, which is a continuation-in-part of application No. 15/044,641, filed on Feb. 16, 2016, now abandoned, which is a continuation-in-part of application No. 14/833,037, filed on Aug. 21, 2015, now Pat. No. 10,073,814, which is a continuation-in-part of application No. 14/833,033, filed on Aug. 21, 2015, now Pat. No. 9,904,657.

(60) Provisional application No. 62/116,707, filed on Feb. 16, 2015, provisional application No. 62/040,091, filed on Aug. 21, 2014.

(51) Int. Cl.
G09B 23/02    (2006.01)
G09B 5/02    (2006.01)

(52) U.S. Cl.
CPC .............. *G09B 23/02* (2013.01); *G09B 5/02* (2013.01)

(58) Field of Classification Search
CPC .................................. G09B 23/02; G09B 5/02
See application file for complete search history.

(56) References Cited

U.S. PATENT DOCUMENTS

| | | | |
|---|---|---|---|
| 9,754,511 B2 * | 9/2017 | Peterson | G09B 23/02 |
| 2006/0001667 A1 * | 1/2006 | LaViola, Jr. | G09B 23/02 345/473 |

OTHER PUBLICATIONS

U.S. Appl. No. 15/939,153, Notice of Allowance dated Oct. 9, 2018, 21 pages.

* cited by examiner

*Primary Examiner* — Eddy Saint-Vil

(74) *Attorney, Agent, or Firm* — Avant Law Group, LLC

(57) ABSTRACT

A tile instructional system for presenting a linear growth problem and for allowing the linear growth problem to be solved comprises an input tray having at least a first tile and a second tile. The first tile has a first marking and the second tile has a second marking. Each of the first tile and the second tile is configured to selectively expand in accordance with its respective marking. The system includes a tile bed comprising a plurality of tile slots. Each of the plurality of tile slots is configured to receive a tile. The linear growth problem is solvable by situating in the tile bed at least one of the first tile and the second tile and by causing each tile situated in the tile bed to expand in accordance with its respective marking to fill the tile bed.

19 Claims, 33 Drawing Sheets

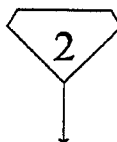

(H) Prompting to solve lead problem within next teaching topic through physical user interface, if answering data for specific problem matches optimal solution of specific problem, or if specific problem is last problem within arbitrary teaching topic, wherein arbitrary teaching topic is followed by next teaching topic within series of teaching topics (I) Executing first plurality of iterations for steps (D) through (H) with processor by using either next problem within arbitrary teaching topic of arbitrary iteration or lead problem within next teaching topic of arbitrary iteration as specific problem of subsequent iteration, until arbitrary iteration is circumstantially designated as last iteration by processor, wherein arbitrary iteration and subsequent iteration are from first plurality of iterations

FIG. 3

GROWTH RULES
| TILES | LINEAR FUNCTIONS |
|---|---|
|  | y=x+1 |
|  | y=x+1 |
|  | y=4x+1 |
| 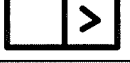 | y=x+2 |
|  | y=2x+2 |
| 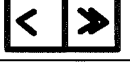 | y=3x+2 |
| 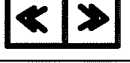 | y=4x+2 |
|  | y=2x+4 |
|  | y=4x+4 |
|  | y=1 |
|  | y=2 |
|  | y=3 |
FIG. 21

TILE INSTRUCTIONAL SYSTEMS AND METHODS OF MAKING AND USING SAME

CROSS REFERENCE TO RELATED APPLICATIONS

This Application is a continuation of U.S. patent application Ser. No. 16/137,151 filed Sep. 20, 2018 and titled "Liquid Flow Instructional Systems and Methods of Making and Using Same", which is a continuation-in-part of U.S. patent application, Ser. No. 15/939,153 filed Mar. 28, 2018 and titled "Method for efficiently teaching content using an adaptive engine and a physical input entry device", which is a continuation-in-part of U.S. patent application Ser. No. 15/369,699 filed Dec. 5, 2016 and titled "Method for Efficiently Teaching Content Using an Adaptive Engine." The '699 application is in-turn a continuation-in-part of U.S. patent application Ser. No. 15/044,641 filed Feb. 2, 2016, which is a continuation-in-part of U.S. patent application Ser. No. 14/833,033 filed Aug. 21, 2015, which is a continuation-in-part of U.S. patent application Ser. No. 14/833,037 filed Aug. 21, 2015. The '699 application also claims priority to U.S. Provisional Application, Ser. No. 62/116,707 filed Feb. 16, 2015, and to U.S. Provisional Application, Ser. No. 62/040,091 filed Aug. 21, 2014. The disclosure of each of these applications is incorporated by reference herein in its entirety.

BACKGROUND OF THE DISCLOSURE

Mathematics is a structured network of cognitive abstractions subject to precise laws, originally presented almost entirely in prose text and numerals. This approach was the norm until symbolic representation was invented around the 15th Century. The introduction of the symbolic representation allowed people to understand and grasp the abstract nature of mathematics easier and quicker, though at a cost in requiring mastery of the notation and its precise grammatical rules. Resultantly, symbolic representation grew in popularity in mathematics and the associated fields, eventually becoming the new norm and standard. Over the years, symbolic representation became ingrained in mathematic problems present in education, research, science, and engineering. In fact, symbol representation has been used for so long that people assume that mathematic problems can be presented and solved only with symbols and resultantly cannot discern the difference between the visual interface, i.e. symbols, and mathematics itself. While extremely beneficial for research and application purposes, symbolic representation does hinder many people in understanding and using mathematics. Numerous research studies going back to the early 1990s have shown that, when ordinary people are repeatedly presented with mathematical problems in a (non-symbolic) meaningful real-world or real-world-like environment, they rapidly achieve a high level of proficiency. This implies that the difficulties many people experience in doing mathematics are primarily of a linguistic nature, also known as the symbol barrier, and do not indicate a lack of mathematical thinking capacity.

Modern technology allows for new and novel means for representation of ideas and theories. The present disclosure relates in part to an alternative representation for problems about linear growth functions that eliminates the traditional use of symbols to provide an alternative and user-friendly interface for mathematics. More specifically, the present disclosure relates in part to a method of using a tiling system, which can be either a physical system or a simulated representation thereof, to visually represent and solve problems about linear growth functions, thus overcoming the symbol barrier. This alternative approach to representing mathematical problems may have significant potential, both for uses in mathematics and for educational purposes. The artisan understands that linear growth is a ubiquitous phenomenon in many walks of life, and ways to assist people in developing an understanding of linear growth and to be able to reason productively about linear growth may, accordingly, play a major role in mathematics education

FIELD OF THE DISCLOSURE

The disclosure relates generally to tile instructional systems and methods. More specifically, the disclosure relates to using physical or other tile systems for providing instruction regarding linear growth functions.

SUMMARY

In an embodiment, a tile instructional system for presenting a linear growth problem and for allowing the linear growth problem to be solved comprises an input tray having at least a first tile and a second tile. The first tile has a first marking and the second tile has a second marking. Each of the first tile and the second tile is configured to selectively and linearly expand in accordance with its respective marking. The system includes a tile bed comprising a plurality of tile slots. Each of the plurality of tile slots is configured to receive a tile. The system comprises a switch. The linear growth problem is solvable by situating in the tile bed at least one of the first tile and the second tile and by causing each tile situated in the tile bed to expand in accordance with its respective marking to fill the tile bed. The first marking comprises a left chevron marking and the second marking comprises a right chevron marking. The selective expansion of each tile situated in the tile bed is effectuated via the switch.

In another embodiment, a tile instructional system for presenting a linear growth problem and for allowing the linear growth problem to be solved comprises an input tray having at least a first tile and a second tile. The first tile has a first marking and the second tile has a second marking. Each of the first tile and the second tile is configured to selectively expand in accordance with its respective marking. The system includes a tile bed comprising a plurality of tile slots. Each of the plurality of tile slots is configured to receive a tile. The linear growth problem is solvable by situating in the tile bed at least one of the first tile and the second tile and by causing each tile situated in the tile bed to expand in accordance with its respective marking to fill the tile bed.

In yet another embodiment, a method for presenting and solving a linear growth problem comprises providing an input tray having at least first tile and a second tile. The first tile has a first marking and the second tile has a second marking. The method includes configuring each of the first tile and the second tile to selectively expand in accordance with its respective marking. The method comprises providing a tile bed having a plurality of tile slots, where each of the plurality of tile slots is configured to receive a tile. The method includes situating in the tile bed at least one of the first tile and the second tile. The method comprises solving the linear growth problem by causing each tile situated in the tile bed to expand in accordance with its respective marking to fill the tile bed.

BRIEF DESCRIPTION OF THE SEVERAL VIEWS OF THE DRAWINGS

Illustrative embodiments of the present disclosure are described in detail below with reference to the attached drawing figures and wherein:

FIG. 3 is another flowchart depicting a high-level operation of the system of FIG. 13, in an embodiment.

FIG. 21 is a table that illustrates example tiles and tile sections of the tile instructional system of FIG. 19 and growth rules associated therewith.

DETAILED DESCRIPTION

A major component of digitally implemented learning systems in mathematics (the field used in this application for illustrative purposes) is the regular provision of problems or puzzles that need to be solved to proceed. It is well established in mathematics education that to be most effective, problems or puzzles must be at the upper limit of a user's ability at that moment—within what is known as the user's zone of proximal development (ZPD). To achieve this aim, the system must constantly monitor the performance of the user to determine, dynamically, what the user's current ability level is, and to select problems or puzzles that keep the user in his or her ZPD. Since mathematical problems or puzzles can be developed on a linear scale of difficulty, doing this is straightforward, and has been implemented on many occasions in different systems. Use of such a linear scale of difficulty can work well in a system that focuses on one particular skill or technique. However, for a learning system that covers a range of topics, there is a tension between ensuring curriculum coverage and maintaining the user in his or her ZPD.

Some embodiments of the present disclosure relate generally to the field of cognitive testing and adaptive learning. More specifically, some embodiments of the present disclosure include methods and systems for effectively and efficiently teaching educational content using adaptive learning and open-ended problems or puzzles. In embodiments, an individual's performance is monitored while he or she is solving a problem and the disclosed systems and methods utilize adaptive learning to select subsequent problems or puzzles of the requisite level of difficulty. This ensures that the individual is adequately challenged and is kept in his or her ZPD. At the same time, embodiments of the present disclosure ensure adequate coverage of each offered curriculum by requiring the individual to solve a specific problem from each curriculum; which if solved, demonstrates high degree of proficiency. A variety of problems may be used for the present disclosure in order to suit the education level for each individual. The problems may be represented in the form of a puzzle or may be presented through a variety of mediums. The ideal problem, in embodiments, is an open-ended problem that is presented to the individual in the form of a puzzle, a game essentially.

Figure 13:
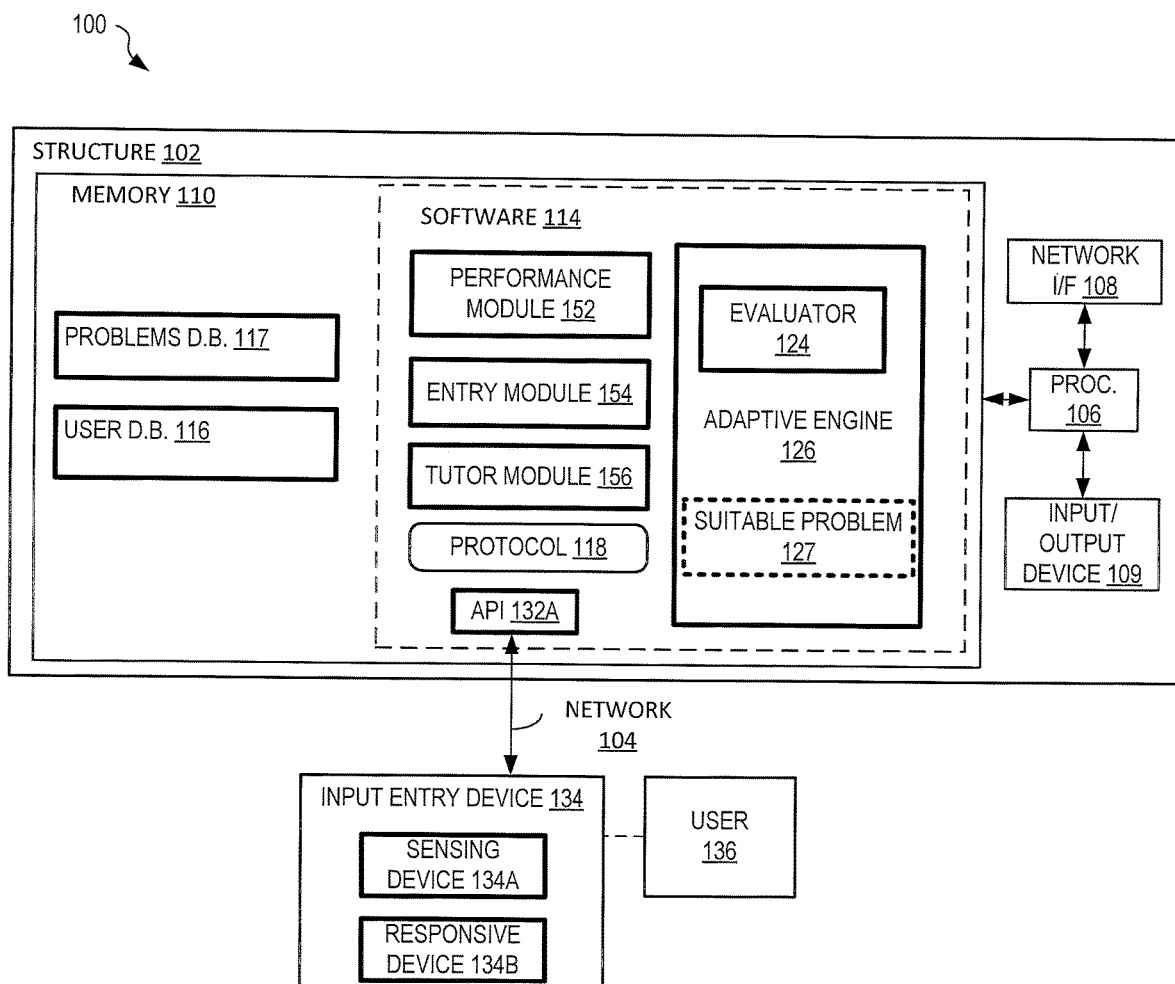
FIG. 13 is a schematic representation of the system for adaptively teaching content to the user, in an example embodiment.
Figure 14:
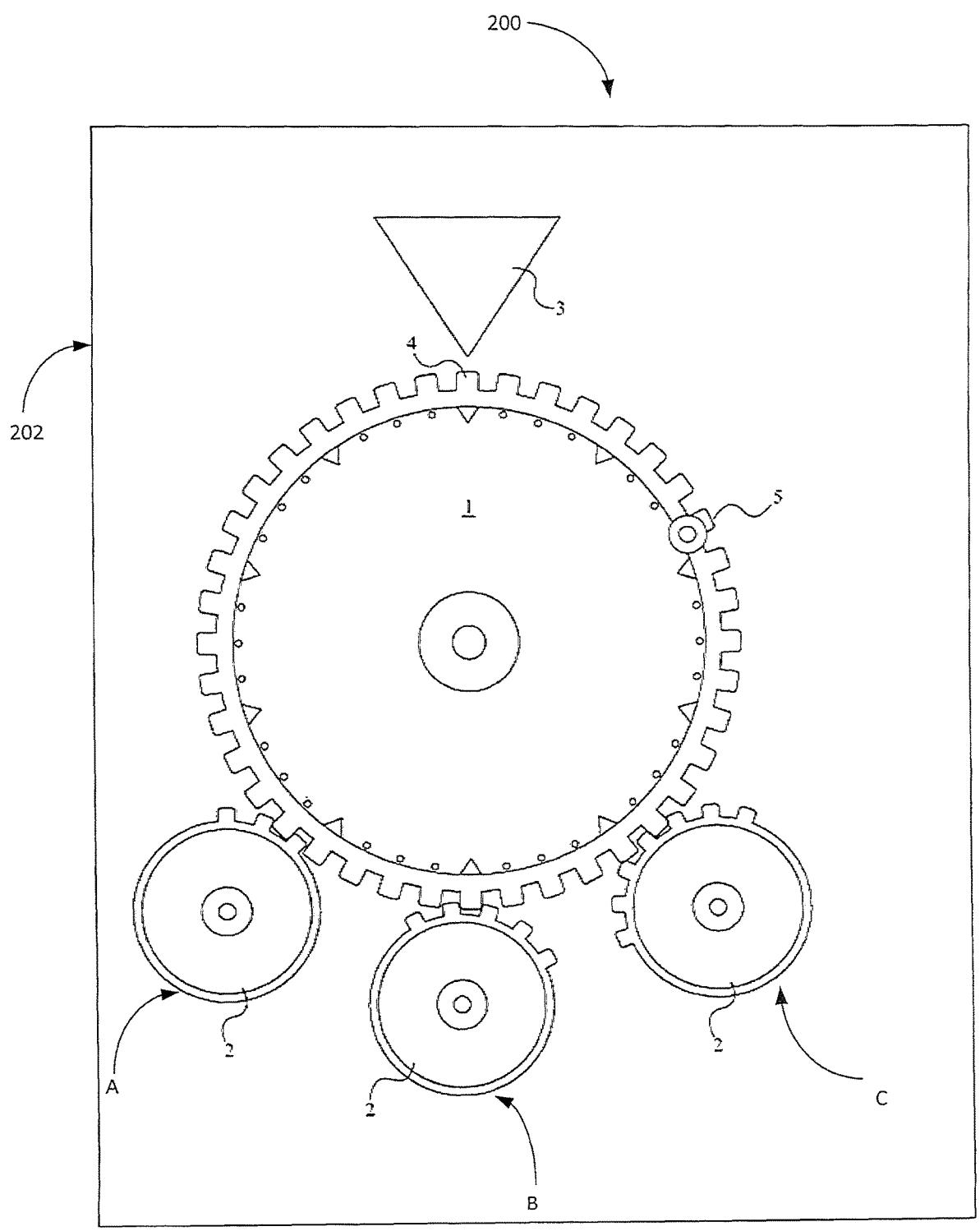
FIG. 14 is a schematic representation of an example physical input entry device of the system of FIG. 13, here a gear system, in an embodiment.

Some embodiments of the present disclosure also relate to systems usable to present such open-ended (or other instructional) problems, and to methods of making and using such systems. These systems, in addition to presenting the instructional problems to the user, may be configured to allow the user to respond to the problems in a step by step fashion such that insight is gleaned into the user's problem solving thought process. Such insights into the user's thought process while solving problems may allow the instruction to be better tailored to the user, as compared to, for example, the conventional multiple choice format used in schools today. In an embodiment, the instructional system may be a gear system (such as a physical or virtual gear system). In another embodiment, and as discussed in more detail herein, the instructional system may be a liquid flow system (such as a physical or a virtual liquid flow system). In another embodiment still, the instructional system may be a tiles system (such as a physical or a virtual tiles system). These different instructional systems may be generally configured to present to the user (and educate the user about, determine the user's mastery in, etc.) different types of problems. For example, the gears system may be generally configured to present algebraic problems. The liquid flow system may be generally configured to present problems regarding proportional reasoning (e.g., fractional quantities, decimals, percentages, relative areas, etc.). The tiles system may be generally configured to present problems relating to linear growth functions, e.g., simultaneous linear equations with a single unknown. And so on. The disclosure below discusses the various concepts outlined above in more detail. Specifically, FIG. 1 and the associated discussion thereof in the disclosure relates to an organizational scheme for storing problems when adaptively and efficiently teaching content to a user. FIG. 13 shows a system for adaptively and efficiently teaching content to a user, and FIGS. 2-12 relate to various aspects thereof. FIG. 14 relates to a physical or virtual gear system which may be a part of or which may be usable with the instructional system of FIG. 13. FIGS. 15, 16A-16C, 17A-17F, and 18A-18C relate to a physical or virtual liquid flow system which may be a part of or which may be usable with the instructional system of FIG. 13. FIGS. 19, 20A-20D, and 21 relate to a physical or virtual tiles system which may be part of or which may be usable with the instructional system of FIG. 13. The disclosure discusses these figures in-turn.

Figure 1:
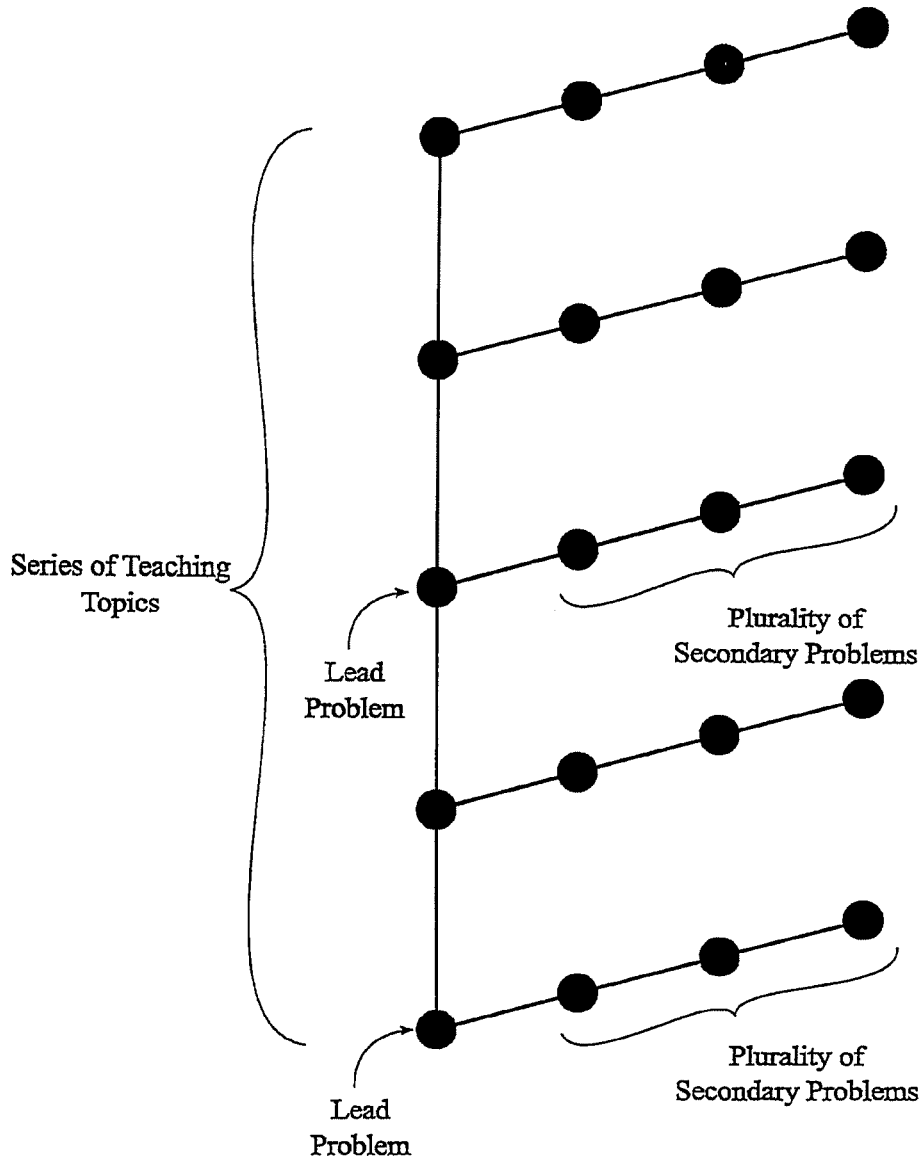
FIG. 1 is a schematic representation of a problem structure employed by a system (shown below in FIG. 13) for adaptively teaching content to a user, in an embodiment.

Referring to FIG. 1, the present disclosure includes a series of teaching topics, wherein each teaching topic includes a lead problem and a plurality of secondary problems (Step A). Each of the teaching topics is associated with a specific curriculum; a curriculum may be focused on a specific concept, puzzle type, theme, or a field of study. For example, one implementation of the present disclosure utilizes different mathematical concepts and problem-solving challenges in order to make up the series of teachings topics. The lead problem and secondary problems for each teaching topic all focus on the same curriculum. Each of the problems is an open-ended problem or puzzle and can be solved in a multitude of ways, with each way being associated with an answer that is satisfactory according to a prescribed measure. More specifically, the lead problem and the secondary problems for each of the teaching topics are associated with an optimal solution and at least one other solution (Step B). The optimal solution may be defined based on the least number of steps used to solve the problem, the highest score attained in solving the problem according to a prescribed scoring system, the exact sequence of steps taken to solve the problem ("solution path"), and/or other similar characteristics. The other solution is any solution other than the optimal solution. The artisan will understand from the disclosure herein that a problem may have two or more optimal solutions (e.g., where the optimal solution is defined based on the least number of steps, two or more solutions may be deemed optimal where they each involve the same (lowest) number of steps). Similarly, the artisan will appreciate that a problem may have two or more solutions other than the optimal solution. Thus, each of the phrases "an optimal solution", "the optimal solution", "other solution", "the other solution", etc., may but need not refer to a solitary solution.

As can be seen in FIG. 1, in an embodiment of the present disclosure, the series of teachings topics is organized in a tree-like structure, comprising a central trunk and a multitude of branches. The central trunk comprises the lead problems for each of the teaching topics arranged in a linear fashion. Each of the lead problems is further connected to an emanating branch. Each branch comprises the secondary problems associated with the teaching topic of the lead problem. The secondary problems and lead problem for each of the teaching topics is further associated with a difficulty rank that is used to incrementally increase the problem difficulty for the individual. In an embodiment of the present disclosure, the difficulty rank of the lead problem is greater than the difficulty rank of each secondary problem within each of the teaching topics. Thus, the lead problem is used as a test for the associated teaching topic. If the individual can effectively solve the lead problem for a specific teaching topic, then he or she may skip the secondary problems of the specific teaching topic. This allows an individual that has a high level of proficiency to quickly progress through the series of teaching topics to a curriculum that adequately challenges him or her without having to repeat content which he or she has already mastered.

Embodiments of the present disclosure comprise a method and a system. The method delineates the rules and steps necessary to construct a specific path for a user through the series of teaching topics. The specific path is based on the performance of the user and thus is modified after each problem addressed by the user. The system comprises the physical components necessary to execute the method of the present disclosure. The system may comprise a personal computing (PC) device and a physical input entry device discussed further below. The PC device includes a processor and a physical user interface (Step C). As discussed herein, the physical user interface (or the physical input entry device) may be a device not conventionally associated with generic computers. The processor executes the method of the present disclosure in the form of a software application at least in part. The computing device administers the series of teaching topics and the physical input entry device allows the user to interact with the present disclosure to solve and transition through the series of teaching topics. Type of devices that may be used as the PC device include, but are not limited to, desktop computers, laptop computers, smartphones, tablets, and other similar electronic devices. Types of devices usable in the present disclosure as the physical input entry device are discussed further below. As discussed in more detail herein, in some embodiments, the functions of the physical input entry devices may be effectuated by virtual devices, e.g., by means of interactive graphical user interfaces that emulate these physical input entry devices and allow for the solution path of the user to be captured and evaluated.

Two important aspects to note for the present disclosure: there are no multiple-choice questions and the user must carry out all key steps of the problem or puzzle with the PC device. This allows the present disclosure to monitor and track every step that the user goes through ("solution path") in order to solve the problem or puzzle, thus providing raw descriptive information relating to the individual's cognitive/solving ability.

Figure 2:
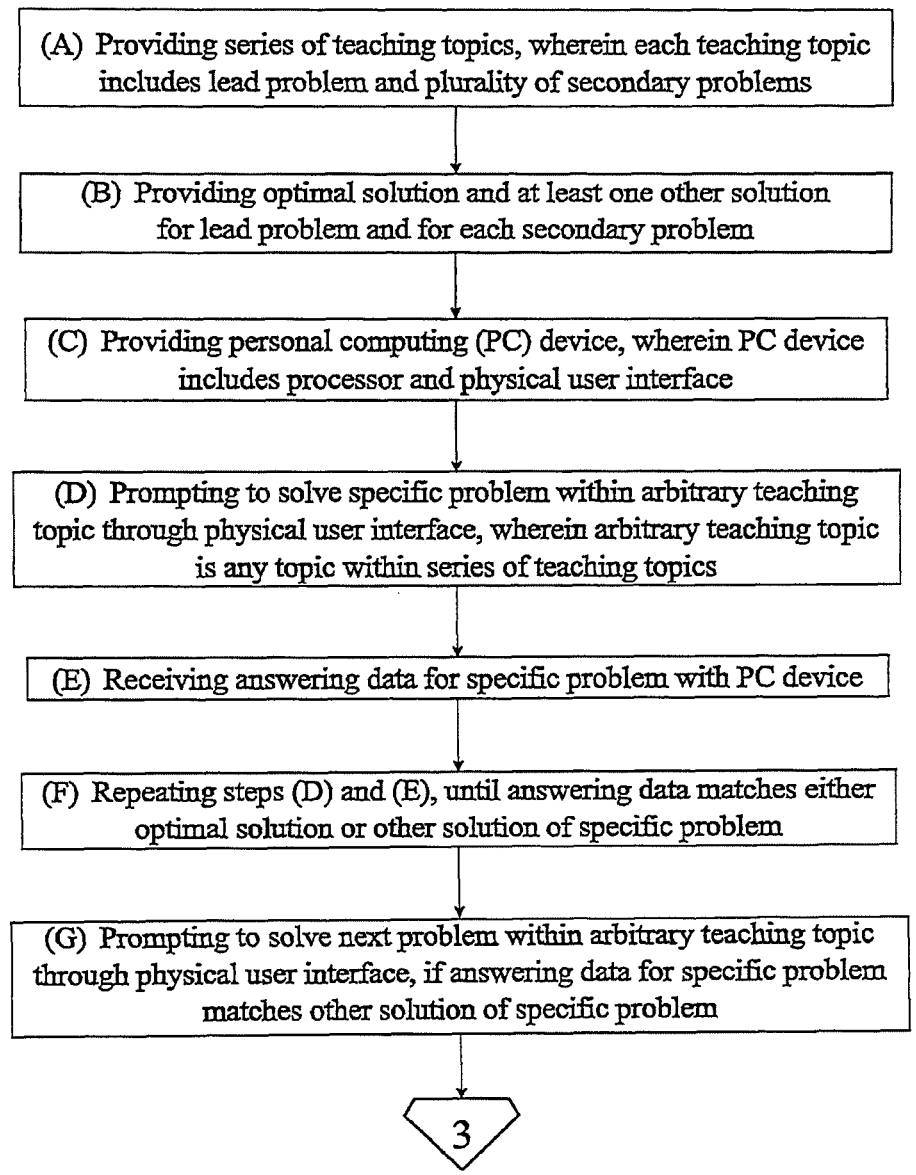
FIG. 2 is a flowchart depicting a high-level operation of the system of FIG. 13, in an embodiment.

Referring to FIG. 2 and FIG. 3, the overall process of the present disclosure begins with the physical user interface prompting to solve a specific problem within an arbitrary teaching topic, wherein the arbitrary teaching topic can be any topic within the series of teaching topics (Step D). The user then attempts to solve the specific problem through the physical user interface. Answering data for the specific problem is received with the PC device (Step E) to be analyzed. If the answering data is not acceptable, then Steps D and E are repeated until the answering data matches either the optimal solution or the other solution of the specific problem. Once a solution for the specific problem is found, the user's performance is analyzed based on which solution was found and, resultantly, directed accordingly through the series of teaching topics.

If the answering data of the specific problem matches the other solution of the specific problem, then the user is directed to solve a next problem within the arbitrary teaching topic; the computing device prompts to solve the next problem within the arbitrary teaching topic (Step G). The other solution for the specific solution indicates average proficiency in the curriculum of the arbitrary teaching topic. In which case, the user is directed to solve the secondary problems from the arbitrary teaching topic in order to practice, achieve mastery, and ensure curriculum coverage before progressing to the next curriculum, i.e. the next teaching topic following the arbitrary teaching topic. In other words, this conditional moves the user through the branch of the arbitrary teaching topic one problem at a time if any solution besides the optimal solution is entered. Alternatively, if the answering data of the specific problem matches the optimal solution of the specific problem, then the user is prompted to solve the lead problem within a next teaching topic through the physical user interface (Step H). The next teaching topic is defined as the teaching topic following the arbitrary teaching topic within the series of teachings topics. In general, identifying the optimal solution for the specific problem signifies that the user has the required degree of solution proficiency for the curriculum associated to the arbitrary teaching topic. Thus, the user is permitted to skip the rest of the problems within the arbitrary teaching topic and jump to the next point in the trunk. This condition endures that the user is kept within his or her ZPD at each step within the series of teaching topics.

Additionally, during Step H, if the specific problem is a last problem within the arbitrary teaching topic, then the user is prompted to solve the lead problem within the next teaching topic, regardless whether the answering data for the specific problem matches the optimal solution or the other solution of the specific problem. Reaching and solving the last problem within the arbitrary teaching topic indicates that the user has reached an acceptable proficiency for the curriculum associated with the arbitrary teaching topic and is thus permitted to move on to the next teaching topic.

Finally, the last step in the overall process of the present disclosure is executing the aforementioned steps for the series of teaching topics. In particular, executing a first plurality of iterations for Steps D through H with the processor by using either the next problem within the arbitrary teaching topic of an arbitrary iteration or the lead problem within the next teaching topic of the arbitrary iteration as the specific problem of a subsequent iteration (Step I). This is executed until the arbitrary iteration is circumstantially designated as a last iteration by the processor. The arbitrary iteration and the subsequent iteration are from the first plurality of iterations. Each of the first iterations is Step D through H being executed for a particular problem; the particular problem is dependent on the user's real-time performance and knowledge/proficiency of the curriculum being addressed.

Figure 6:
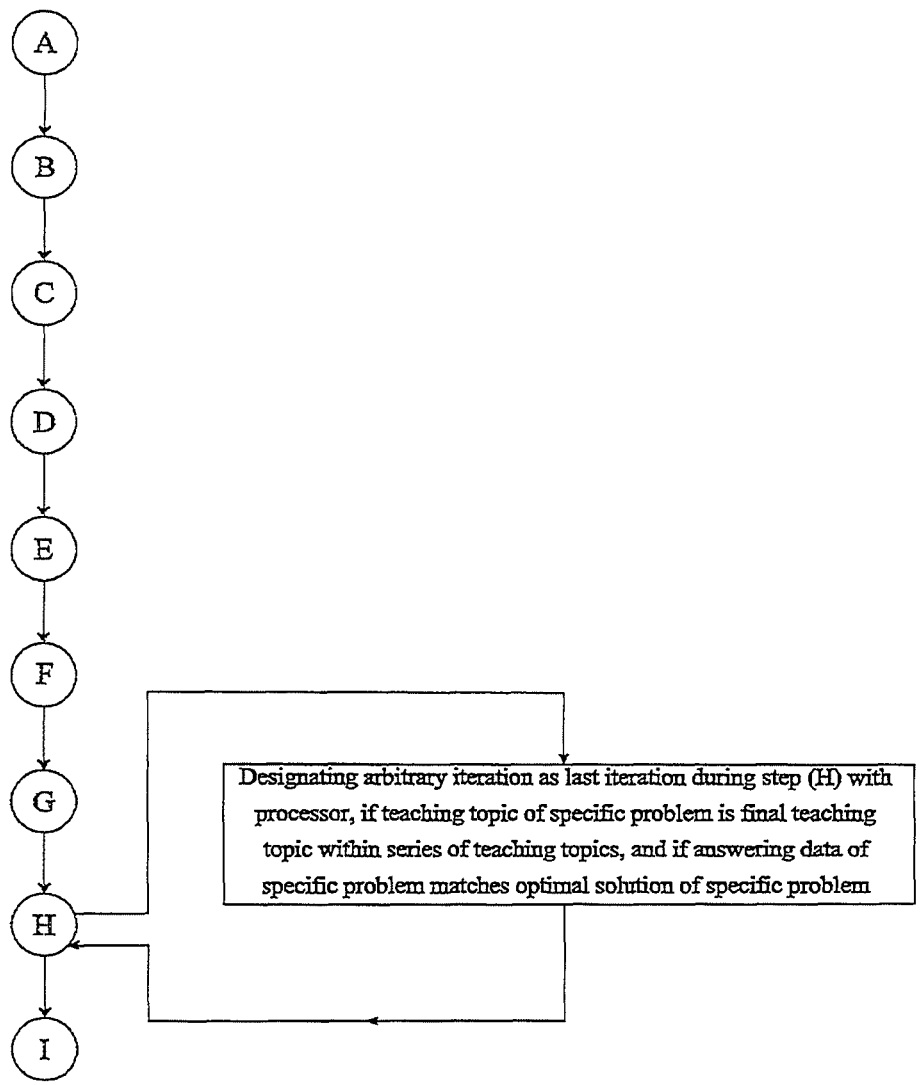
FIG. 6 is a flowchart depicting a process used by the system of FIG. 13 to designate a final iteration of the teaching process.

The overall process of the present disclosure is executed until the user demonstrates adequate proficiency in every teaching topic. In relation to the overall process, this is the case when the arbitrary iteration is designated as the last iteration. One such instance is when the user shows adequate proficiency in a final teaching topic by solving one of the problems from the final teaching topic with the optimal solution of said problem; wherein the final teaching topic is the last topic within the series of teaching topics. Referring to FIG. 6, the user is finished if the following conditions are met: (1) the teaching topic of the specific problem is the final teaching topic; and (2) the answering data for the specific problem matches the optimal solution of the specific problem. If these conditions are met, then the arbitrary iteration is designated as the last iteration during Step H with the processor. Thus, indicating that the user has mastered the curriculum of the final teaching topic and, resultantly, has finished the series of teaching topics.

Figure 7:
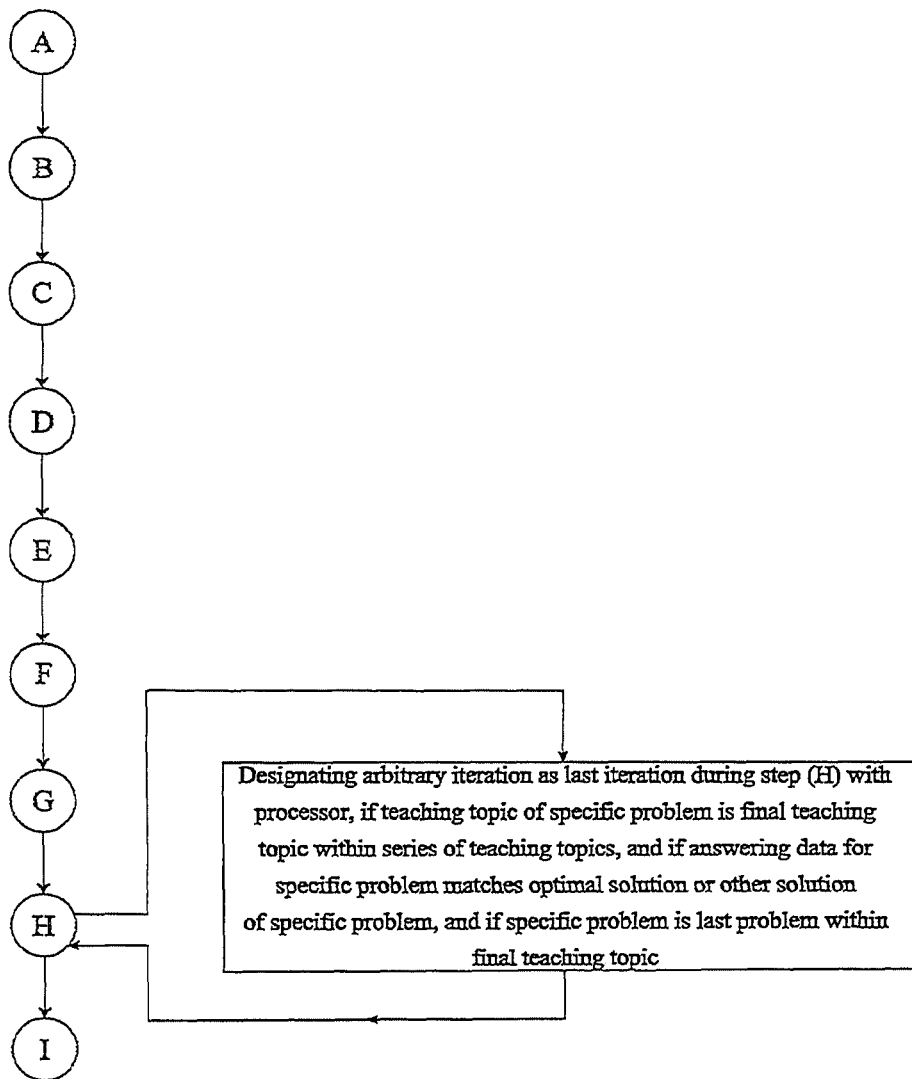
FIG. 7 is a flowchart depicting another process used by the system of FIG. 13 to designate a final iteration of the teaching process.

Another instance is when the user has reached and solved a last problem within the final teaching topic. Referring to FIG. 7, in relation to the overall process, the user is finished if the following conditions are met: (1) the teaching topic of the specific problem is the final teaching topic; (2) the answering data for the specific problem matches either the optimal solution or the other solution of the specific problem; and (3) the specific problem is the last problem within the final teaching topic. If these conditions are met, then the arbitrary iteration is designated as the last iteration during Step H by the processor, and the user finishes the series of teaching topics.

Figure 4:
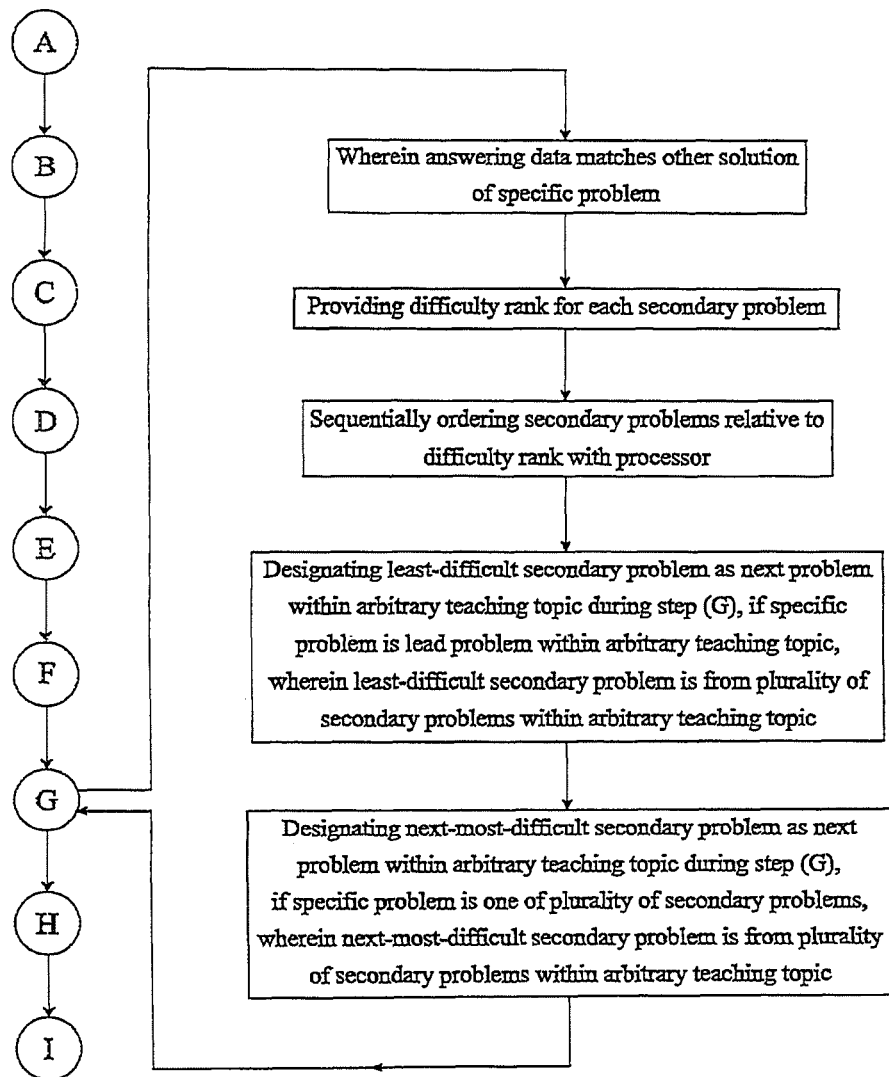
FIG. 4 is a flowchart outlining a method used by the system of FIG. 13 to determine whether the user's answering data matches a solution to a problem presented to the user.
Figure 5:
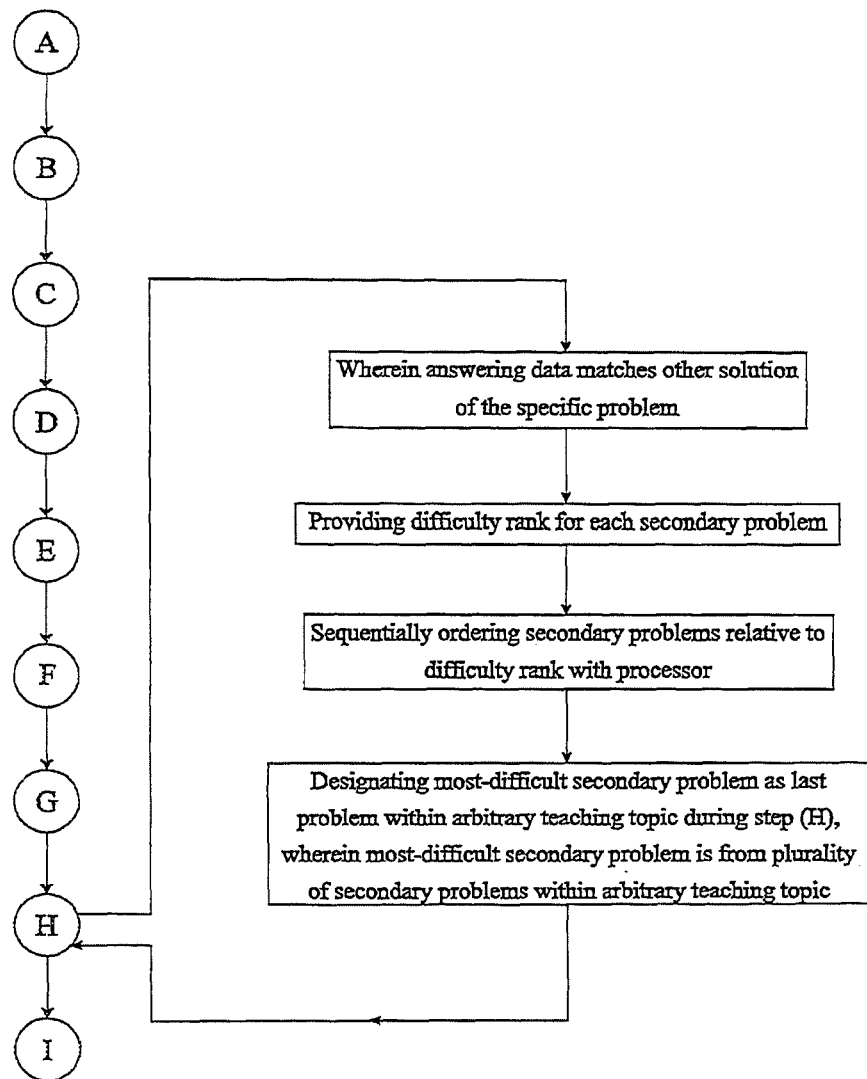
FIG. 5 is a flowchart outlining a method used by the system of FIG. 13 to determine whether the user's answering data matches an optimal solution to the problem.

Referring to FIG. 4, if the user finds the other solution for the specific problem, then he or she may be directed onto two different paths. The determining factor is if the specific problem is either the lead problem or one of the secondary problems. Prior to directing the user, the processor first sequentially orders the secondary problems relative to the difficulty rank such that the user is incrementally exposed to harder and harder problems. If the specific problem is the lead problem, then the user is directed to solve the secondary problems within the arbitrary teaching topic. More specifically, a least-difficult secondary problem is chosen and designated as the next problem within the arbitrary teaching topic during Step G, wherein the least-difficult secondary problem is from the plurality of secondary problems within the arbitrary teaching topic.

Alternatively, if the specific problem is one of the plurality of secondary problems, then the user is directed to solve the problem after the specific problem within the arbitrary teaching topic. In particular, a next-most-difficult secondary problem is designated as the next problem within the arbitrary teaching topic during Step G. The next-most-difficult secondary problem is from the plurality of secondary problems within the arbitrary teaching topic. Furthermore, it is important to note that the last problem referenced in Step H is the final problem within the arbitrary teaching topic. More specifically, a most-difficult secondary problem is designated as the last problem during Step H; wherein the most-difficult secondary problem is from the plurality of secondary problems within the arbitrary teaching topic. The final problem is the most difficult in order to test the user in the curriculum of the arbitrary teaching topic.

Figure 8:
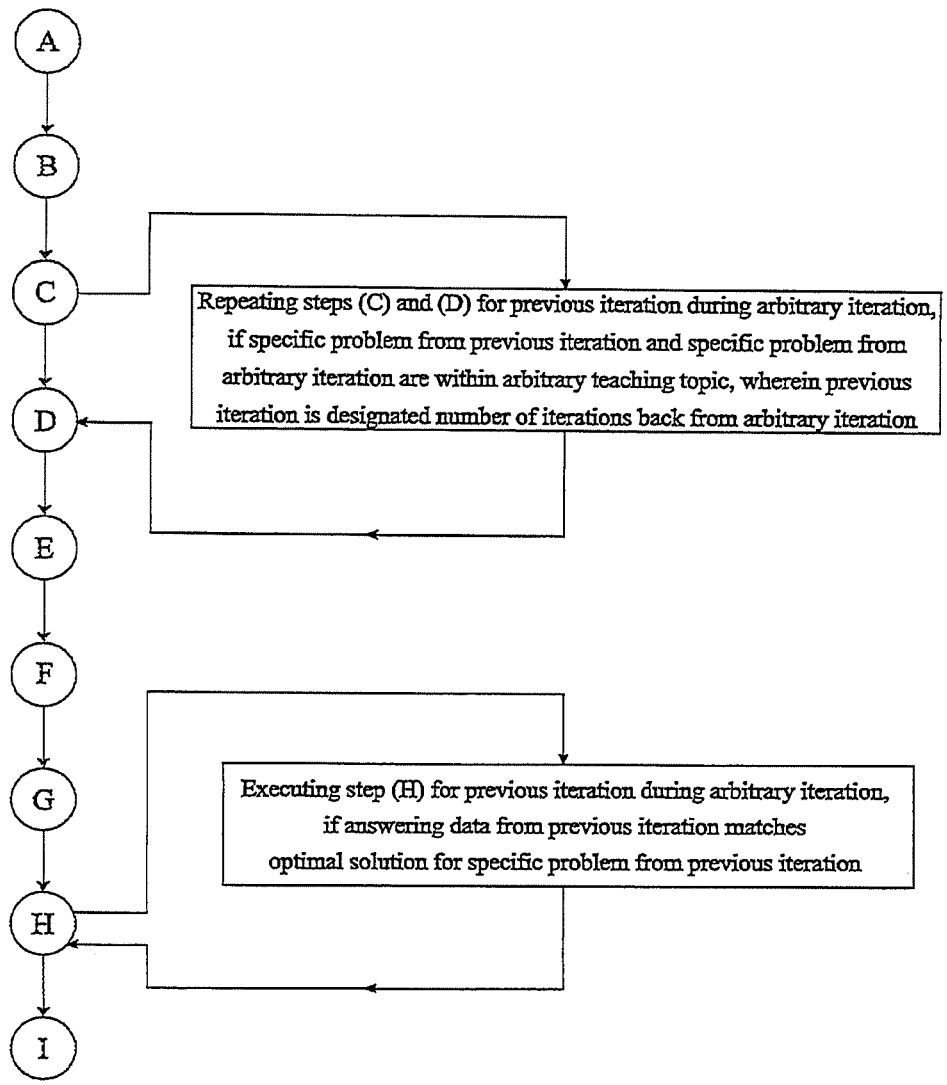
FIG. 8 is a flowchart depicting another process used by the system of FIG. 13.

Referring to FIG. 8, anytime during the overall process of the present disclosure the user is able to return to previously addressed problems and attempt to find a different solution, in particular, the optimal solution. In relation to the overall process, step C and step D may be repeated for a previous iteration during the arbitrary iteration, if the specific problem from the previous iteration and the specific problem from the arbitrary iteration are within the arbitrary teaching topic, wherein the previous iteration is a designated number of iterations back from the arbitrary iteration. The designated number of iterations is set by an administrator account. Any problems further back than the designated number of iterations will not award the user with the ability to skip to the next teaching topic if he or she identifies the optimal solution. In alternative embodiments of the present disclosure, the user may cross to previous topics in order to repeat problems. If the user matches the answering data from the previous iteration to the optimal solution for the specific problem from the previous iteration, then the system executes step H for the previous iteration during the arbitrary iteration.

Figure 9:
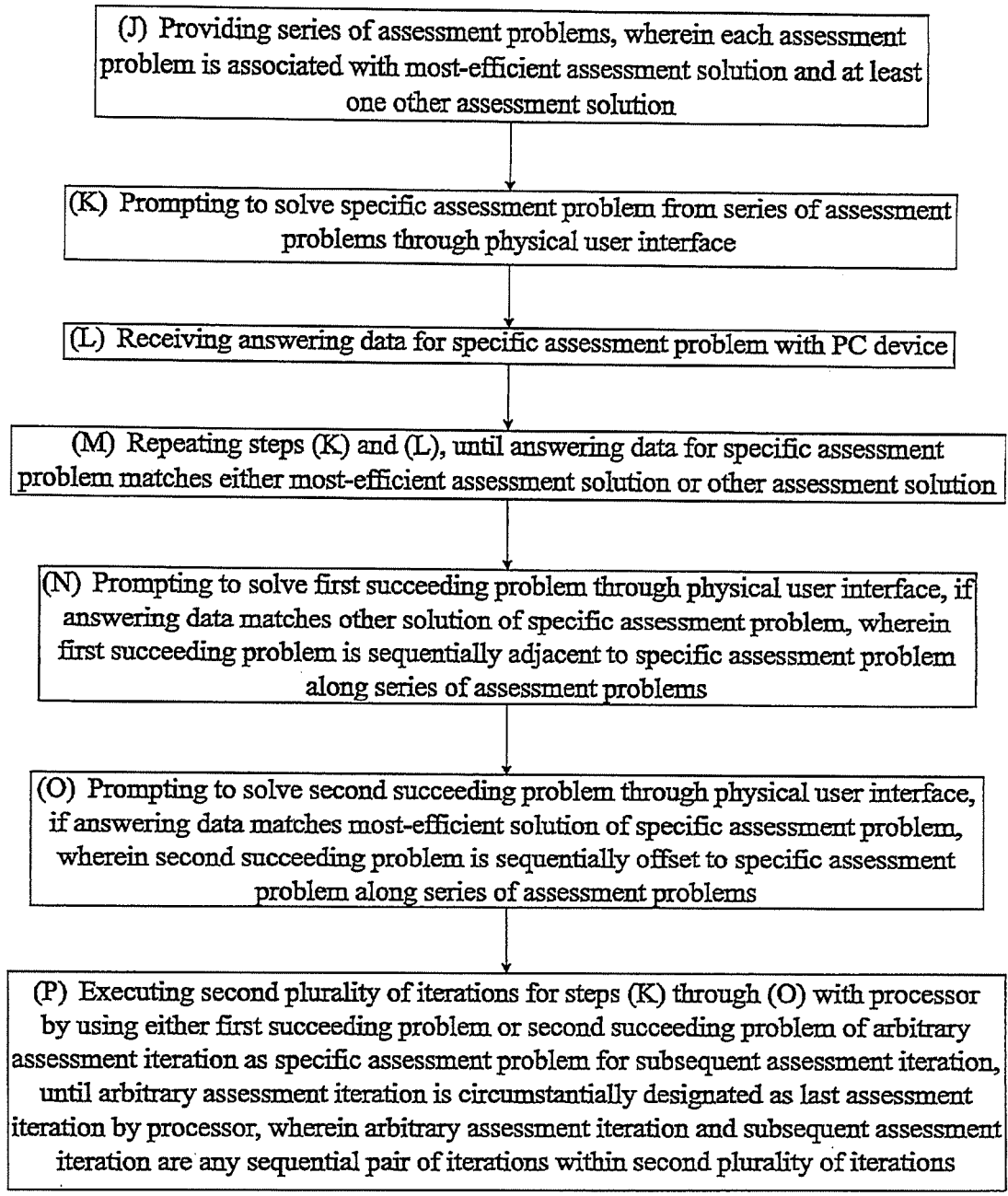
FIG. 9 is a flowchart depicting a process used by the system of FIG. 13 to make an initial assessment of the competencies of the user.

Referring to FIG. 9, prior to allowing the user to solve the series of teachings topics, the present disclosure first requires the user to pass through an entry module. The entry module provides a rapid assessment of the user's ability and proficiency regarding the curriculums within the series of teaching topics. The results from the entry module are used to place the user within the series of teaching topics accordingly. For example, weak users are placed at an initial topic from the series of teaching topics while stronger users may be allowed to skip a number of early topics.

The entry module includes a series of assessment problems, wherein each assessment problem is associated with an optimal assessment solution and at least one other assessment solution, similar to the overall process (Step J). The series of assessment problems is populated with questions, problems, or puzzles of different curriculums, thus allowing the system to fully determine the user's abilities. Additionally, the assessment problems may be easier than the problems from the series of teaching topics. The process for the entry module is similar to the overall process of the present disclosure. First, the user is prompted to solve a specific assessment problem from the series of assessment problems through the physical user interface (Step K). Next, the user solves the specific assessment problem through the physical input entry device. The system receives answering data for the specific assessment problem (Step L). Steps K and L are repeated until the answering data for the specific assessment problem matches either the optimal assessment solution or the other assessment solution of the specific assessment problem. The user's path through the assessment problems is partially adaptive, i.e. the path is dependent on the user's performance.

If the answering data matches the other assessment solution of the specific assessment problem, then the user is incrementally moved to the next problem within the series of assessment problems. In particular, the user is prompted to solve a first succeeding problem through the physical user interface, wherein the first succeeding problem is sequentially adjacent to the specific assessment problem along the series of assessment problems (Step N). This is similar to the overall process.

If the answering data matches the optimal assessment solution of the specific assessment problem, then the user is moved forward through the series of assessment problems a pre-set number of steps. In particular, the user is prompted to solve a second succeeding problem through the physical user interface, wherein the second succeeding problem is sequentially offset from the specific assessment problem along the series of assessment problems (Step 0). The offset, the number of steps, may vary depending on the specific assessment problem, the type of educational content, type of problems, or type of puzzles used for the present disclosure.

The user is maintained within the entry module until he or she reaches and solves a final problem within the series of assessment problems. More specifically, the processor executes a second plurality of iterations for Steps K through O by using either the first succeeding problem or the second succeeding problem of an arbitrary assessment iteration as the specific assessment problem for a subsequent assessment iteration. The second plurality of iterations is executed until the arbitrary assessment iteration is circumstantially designated as a last assessment iteration by the processor. The arbitrary assessment iteration and the subsequent assessment iteration are any sequential pair of iterations within the second plurality of iterations.

Figure 12:
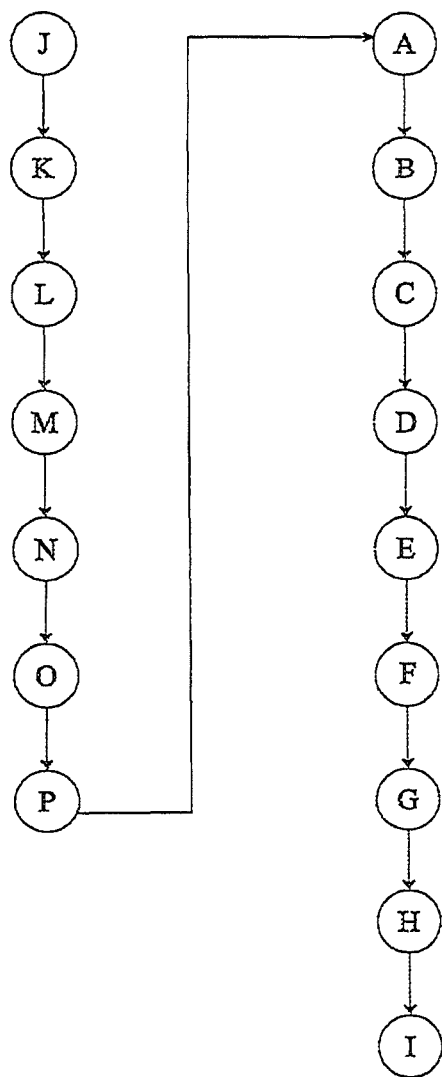
FIG. 12 is a flowchart depicting the workings of an entry module of the system of FIG. 13.

Referring to FIG. 12, the present disclosure utilizes performance data from the entry module to determine where in the series of teaching topics the user should be placed. In order to achieve this, performance criteria are provided for each of the teaching topics. The performance criteria quantify a minimum proficiency/ability necessary to solve problems within the associated teaching topic. Once the user completes the entry module, the processor assesses a performance score for each of the second plurality of iterations.

A variety of scoring methods may be used for determining the performance score. Then, the performance score for each of the second plurality of iterations is compiled into an overall performance score with the processor. The overall performance score is then compared to the performance criteria for each teaching topic with the processor in order to identify a set of matching topics from the series of teaching topics. The set of matching topics is the teaching topics within the series of teaching topics which the user has shown proficiency in and therefore does not need to solve. This ensures that the problems addressed by the user in the overall process of the present disclosure are within his or her ZPD.

Figure 10:
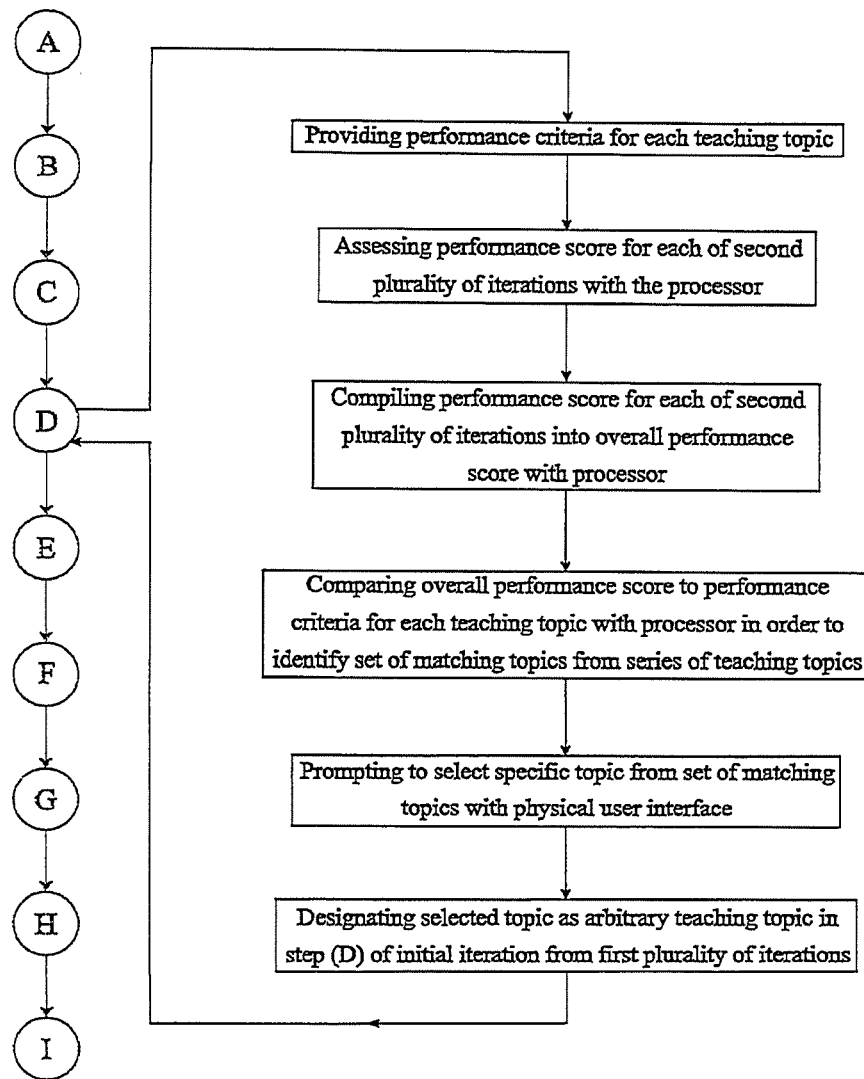
FIG. 10 is a flowchart depicting a process used by the system of FIG. 13 to analyze performance scores of the user so as to place the user within a particular teaching topic from a series of teaching topics.
Figure 11:
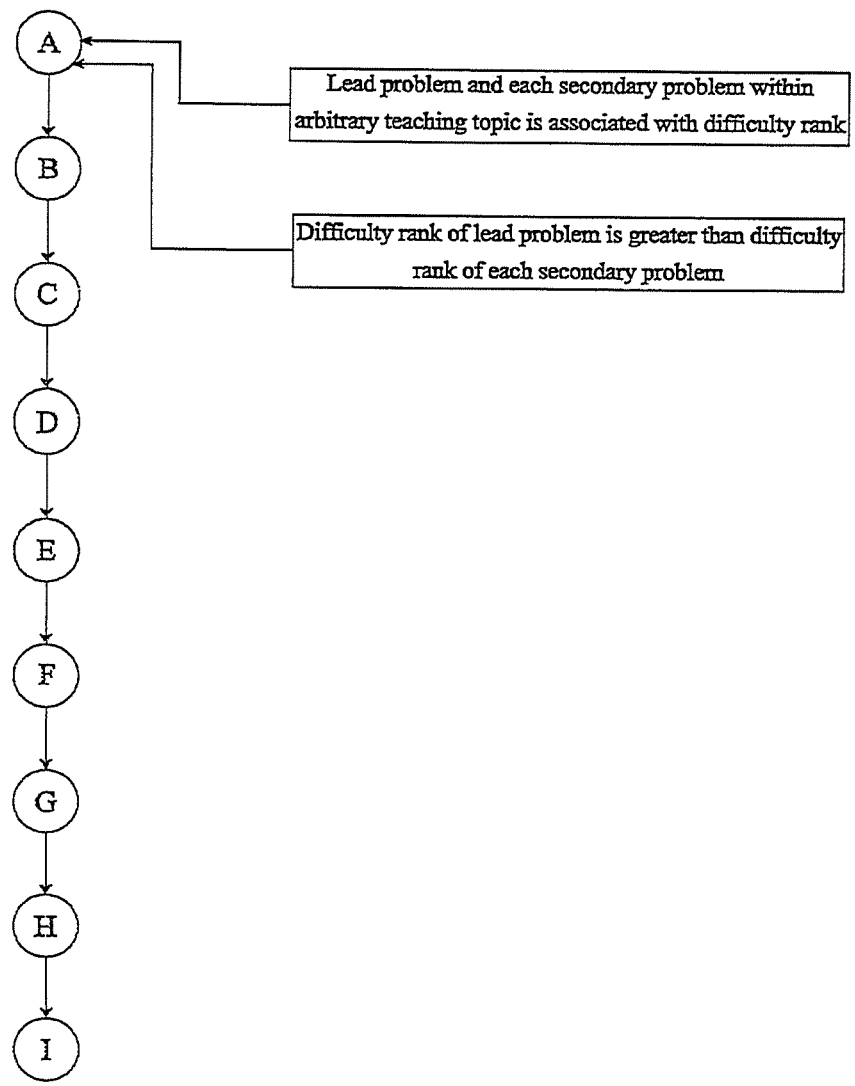
FIG. 11 is a flowchart depicting a process used by the system of FIG. 13 to ensure adequate curriculum coverage for the user.

Once identified, the set of matching topics is then displayed to the user for selection. Referring to FIG. 10, the physical user interface prompts the user to select a specific topic from the set of matching topics. Once chosen, the selected topic is designated as the arbitrary teaching topic in Step D of an initial iteration from the first plurality of iterations. This process assesses the user's ability and places him or her accordingly within the series of teaching topics.

In one embodiment, the present disclosure also includes a basics module, essentially a training area (also referred to herein as a tutor module). If at any point the system identifies that the user is struggling to solve a problem, then he or she may be directed towards the basics module. In one embodiment, certain problems within the entry module are dedicated to separating users with strong and weak abilities. The basics module tutors the user through basic elements utilized in the problems within the series of assessment problems and the series of teaching topics. In order for the user to exit the basics module, the user must complete all the problems and tasks within the basics module. Although, there is a one-time exit opportunity, if the user solves the first predetermined number of problems within the basics module by finding the optimal solution in a single try for each one, then the user may exit the basic module.

In an embodiment, a system for teaching content using an adaptive engine may include one or more computing devices coupled to one or more input entry devices (also referred to herein as an "interface device"). The input entry device coupled to the computing device(s) may be a physical device other than a conventional computer component, such as a keyboard, mouse, a touchscreen display, etc. For example, in embodiments, the input entry device may be a physical device that includes rotatable gears enmeshed with each other. Or, for instance, the physical input entry device may comprise pieces of a puzzle that can be arranged in predefined patterns. In these embodiments, the user may use the physical input entry device to solve one or more problems (e.g., puzzles or other problems) displayed elsewhere, e.g., on a display of the computing device. The computing device may evaluate the inputs provided by the user via the physical input entry device and, based on this evaluation, adaptively select the next problem to be presented to the user. As discussed above, and depending on the user input, the next problem presented to the user may be a problem within the same teaching topic or a different teaching topic (e.g., a lead problem of a different teaching topic).

FIG. 13 shows an example system 100 for teaching content using an adaptive engine and a physical input entry device, as discussed herein. The system 100 may include a structure 102. The structure 102 may be a computer, a server, a network of computer servers, etc., and is shown with a processor 106 communicatively coupled to a network interface 108, an input/output device 109, and a memory 110. Processor 106 represents one or more digital processors. Network interface 108 may be implemented as one or both of a wired network interface and a wireless network interface, as is known in the art. The input/output device 109 may include any suitable input/output device, such as a display, speakers, a keyboard, a mouse, a touchscreen, etc. Memory 110 represents one or more of volatile memory (e.g., RAM) and non-volatile memory (e.g., ROM, FLASH, magnetic media, optical media, et cetera). Although shown within structure 102, memory 110 may be, at least in part, implemented as network storage that is external to structure 102 and accessed via network interface 108.

Software 114, a user database 116, and a problems database 117 may be stored within a transitory or non-transitory portion of the memory 110. Software 114 includes machine readable instructions that are executed by processor 106 to perform the functionality of structure 102 as described herein. The user database 116 may include a plurality of records, each pertaining to one of a plurality of users. For example, the user database 116 may include a listing of lead problems attempted and/or solved by each user, a listing of secondary problems attempted and/or solved by each user, and other such user-specific information. The user database 116 may, in embodiments, be omitted.

The problems database 117 may include a database of lead problems and associated secondary problems, such as mathematical problems or puzzles, or other problems, arranged for example by teaching topic, concept type, puzzle type, theme, field of study, etc. The problems database 117 may further include each or at least a plurality of solutions for each problem, including the optimal solution thereof, together with a difficulty rank for each problem. The software 102 may be configured to present a user a lead problem, and subsequently, another lead problem or a secondary problem associated with the original lead problem, based on an input provided by the user via the input entry device (as discussed herein).

The online structure 102, using protocol 118 and Application Programming Interface 132A, may communicate over a wired or wireless network 104 with an input entry device 134 of a user 136. The user 136 may be any individual (or in embodiments, group of individuals) who are being educated and/or evaluated using the system 100 described herein.

Network 104, which is formed in part by one or more of the Internet, wireless networks, wired networks, local networks, and so on, facilitates communication between the structure 102 and the input entry device. The user 136 views a problem presented by the software 114 on the input/output device 109, e.g., a display of or associated with the online structure 102, and in response thereto, utilizes the input entry device 134 to solve the presented problem. The software 114 evaluates the input provided by the user 136 and, based on this evaluation, presents on the output device 109 another lead problem or a secondary problem having a different difficulty rank. The input entry device 134 may include one or more sensors 134A to allow for relevant interaction of the user 136 with the components of the input entry device 134 to be communicated to the software 114 (e.g., motion and/or rotation detecting sensors such as optical and/or magnetic sensors, pressure detecting sensors, temperature sensors, weight sensors, volume sensors, etc.). In embodiments, the input entry device 134 may also include one or more processors or other such devices to allow for the output of the sensors 134A to be evaluated. In other embodiments, the input entry device 134 may be devoid of a processor or other comparable device and the adaptive engine 126 may be configured to decipher the output of the sensors 134A. In other embodiments, the input entry device 134 may be a stand-alone device (e.g., a battery operated or other dedicated device).

The input entry device 134A may further include, in addition to the sensing devices 134A, responsive devices 134B. The responsive devices 134B may be configured to provide a controlled response in reaction to the sensed input. The responsive devices 134B may be, for example, a pump (e.g., a pump that causes liquid to flow from one location to another based on a user input sensed by a sensor), a light or a speaker that is activated when a puzzle is solved or during the puzzle presentation, a cage that opens when a puzzle is solved by the user, a battery operated lever, a spring activated device, etc.

While the structure 102 is shown as having a solitary input entry device 134 coupled thereto, in embodiments, the structure 102 may have a multitude of input entry devices 134 in communication therewith (e.g., the structure 102 may be in communication with a statistically significant number (such as hundreds of thousands) of input entry devices 134). In these embodiments, each of the plurality of input entry devices 134 may be associated with a unique user. The user, e.g., the user 136, may also couple his or her input entry device 134 with the structure 102 indirectly. For example, in embodiments, the structure 102 may be an online structure (e.g., may be a webserver) and each user may interact therewith by coupling their respective input entry device 134 to their personal (or other) computer which is in-turn coupled to the structure 102. In embodiments, the system 100 may be a dedicated device (e.g., may be configured to effectuate only the purposes described herein).

The software 114 may include an adaptive engine 126. The adaptive engine 126 may include an evaluator 124. The adaptive engine 126 may initially present to the user 136 a lead problem associated with a particular topic via the input/output device 109. The user 136 may use the input entry device 134 in an attempt to solve this lead problem. The user's input may be communicated to the structure 102 as answering data, and the evaluator 124 thereof may evaluate the answering data to determine if the answering data includes or otherwise corresponds to the optimal solution. If so, the evaluator 124 may subsequently present to the user 136 via the input/output device 109 a suitable problem 127 which is associated with a different teaching topic (see FIG. 1). Alternately, if the input provided by the user 136 via the input entry device 134 includes a non-optimal solution, the evaluator 124 may present to the user 136 the suitable problem 127 which, in this case, may be a secondary problem associated with the same teaching topic.

In embodiments, the software 114 may also include a performance module 152, an entry module 154, and a tutor module 156. As is apparent from the disclosure herein, the adaptive engine 126, together with the performance module 154, may monitor the user's performance 136 to ensure that problems are presented to the user 136 so as to adequately challenge the user 136 while keeping the user 136 in his or her ZPD. The entry module 154, also discussed above, may together with the adaptive engine 126 initially present to the user 136 a series of assessment problems to allow the evaluator 124 to obtain a baseline assessment of the user's mastery over the teaching curriculum. The tutor module 156, also referred to as a basics module above, may be configured to tutor the user 136, e.g., by teaching him or her about the basic elements of a teaching topic, based on a determination that the user 136 is struggling to solve the presented problem.

As discussed above, the adaptive engine 126 may adaptively determine the suitable problem 127 based on the input provided by the user 136 via the input entry device 134. In embodiments, when determining the suitable problem 127 to be presented to the user 136, the adaptive engine 126 may also take into account inputs provided by other users. For example, where inputs from a multitude of users indicate that a particular problem within a teaching topic is easier to solve than the preceding problem in that topic, the adaptive engine 126 may, based on these inputs, adaptively change the difficulty rank of these problems in the problems database 117. The artisan will understand that in so doing the system 100 may benefit from a statistically significant number of users 136 (for instance, it may be more beneficial to adaptively change the difficulty rank of a problem based on the input of many thousands of users as compared to changing the difficulty rank of a problem based on the input of two or three users). Thus, use of a statistically significant number of users may facilitate optimal operation of some embodiments of the system 100.

Workings of the disclosure will now be illustrated with an example. The artisan will understand that the example is not intended to be limiting.

Focus is directed to FIG. 14 which shows an input entry device 200. This input entry device 200 is but one example of the input entry device 134. The input entry device 200 is modeled after the gear system in U.S. patent application Ser. No. 14/833,037 filed Aug. 21, 2015, which, as noted above, is incorporated by reference herein. The '037 application illustrates the workings of the physical gear system in detail, but discusses the physical gear system as a stand-alone device. A primary difference between the physical gear system disclosed in the '037 application and the physical gear system 200 is that the gear system 200 is communicatively coupled to the structure 102, as illustrated in FIG. 13 via the input entry device 134. The physical input entry device (or gear system) 200 is described herein to illustrate use of the system 100 for teaching mathematical content, and particularly, algebraic equations, using the adaptive engine 126. The artisan will understand that while mathematical content is used as an example to illustrate the workings of the system 100, that the system 100 may likewise be used to adaptively teach other content to users (e.g., the user 136). The disclosure below first details the example input entry device 200, and then outlines an example use of the input entry device 200 in the system 100 to teach content to the user 136 adaptively.

The physical gear system 200 visually represents each entity of an algebraic equation and allows the user 136 to manipulate said entities through the individual gears of the gear system in order to determine a solution to the algebraic equation. Entities of the algebraic equation include a plurality of terms and at least one numerical constant, wherein one side of the equation is the plurality of terms and the other side of the algebraic equation is at least one numerical constant. Each of the plurality of terms includes a coefficient and a variable. The variable is a symbol that represents an undefined value within the algebraic equation, while the coefficient is a constant number which multiples or amplifies the variable. Solving the algebraic equation includes identifying a value for each of the variables, which would balance the two sides of the algebraic equation.

The illustrated input entry device 200 includes a primary cog 1, a plurality of secondary cogs 2, and a fixed pointer 3. The primary cog represents a range of solutions for the algebraic equation and includes a plurality of teeth that is quantitatively greater than the numerical constant. For example if the numerical constant is 20, than the number of teeth on the primary cog would need to be greater than 20. The plurality of teeth for the primary cog includes an origin tooth 4 and a target tooth 5, each marked accordingly.

The origin tooth marks a starting point that the user 136 may reference in order to identify the remaining teeth within the plurality of teeth, essentially representing the zero value. The target tooth represents the numerical constant of the algebraic equation. The target tooth is quantitatively offset from the origin tooth by the numerical constant, thus visually displaying the numerical constant as a radial increment on the primary cog. Additional teeth may be marked on the primary cog to indicate their respective offset quantity from the origin tooth. In one embodiment, each tooth on the primary cog is marked with a respective offset quantity from the origin tooth. Alternatively, every incremental tooth may be marked.

The plurality of secondary cogs represents the side of the algebraic equation relating to the plurality of terms. Each of the plurality of secondary cogs is associated with a corresponding term from the plurality of terms. This relationship is conveyed to the user by quantitatively matching a plurality of teeth on each secondary cog to the value of the coefficient of its corresponding term. For example, if the corresponding term is "4x", then the secondary cog representing this particular term would have four teeth. Each of the secondary cogs may be marked with a readable label that depicts the coefficient of the corresponding term, in turn conveying to the user the number of teeth present on said secondary cog. Each of the secondary cogs is designed to mesh with and engage the primary cog such that rotation of each of the plurality of secondary cogs is used to drive the rotation of the primary cog. This includes matching the size and type of the teeth used for each of the plurality of secondary cogs to that of the primary cog; a variety of types of teeth may be used for the primary cog and thus the secondary cogs. As discussed herein, because the number of teeth of each of the three secondary cog 2 is disparate, a full rotation of each secondary cog 2 will cause the primary cog to move by different amounts.

The fixed pointer indicates the current output for the input entry device 200, wherein the output corresponds to the side of the algebraic equation associated with the numerical constant. Additionally, the fixed pointer is used to zero/reset the gear system prior to solving the algebraic equation. The gear system 200 is zeroed by positioning the origin tooth coincident with the fixed pointer. The fixed pointer is preferably shaped similar to an arrowhead and is positioned adjacent to the primary cog, oriented towards the center of the primary cog.

In general, the method for solving the algebraic equation involves aligning the target tooth at the fixed pointer, thus setting the current output of the primary cog to be the numerical constant. This is accomplished by first identifying a current tooth at the fixed pointer, wherein the current tooth is any one of the plurality of teeth on the primary cog. If the current tooth is not the origin tooth, then the primary cog is rotated until the origin tooth is set at the fixed pointer, essentially calibrating or resetting the input entry device 200. Once the device 200 is reset, a plurality of rotations with one or more of the plurality of secondary cogs is then executed in order to rotate the primary cog so that the target tooth aligns with the fixed pointer. This alignment between the target tooth and the fixed pointer yields a possible solution for the algebraic equation. The potential solution lies in the number of rotations executed for each of the secondary cogs. For example, two rotations of the secondary cog that is associated with the term "4x" translates to the variable "x" being two. Once the target tooth is aligned with the fixed pointer, then the plurality of rotations is quantitatively identified for each of the secondary cogs as a potential solution for the variable of the corresponding term. The rotation direction of each of the secondary cogs represents either an increase or decrease in value for the variable of the corresponding term. A clockwise rotation by the secondary cog represents a quantitative increment in the potential solution of the variable for the corresponding term. Similarly, a counterclockwise rotation by the secondary cog represents a quantitative decrement in the potential solution of the variable for the corresponding term. For example, rotating one of the secondary cogs three turns clockwise and two turns counterclockwise means the value for the variable of the corresponding term is one.

Positioning the target tooth at the fixed pointer yields a solution for the algebraic equation, wherein the solution includes a potential solution for each of the variables, for each of the terms. However, this solution is only one of many possible solutions for the algebraic equation. The most optimal solution in this example is achieved by minimizing the collective rotations of the secondary cogs 2. The least amount of rotations for each of the plurality of secondary cogs represents the most efficient and optimal solution for the algebraic equation.

The input entry device 200 may also be used to solve the algebraic equation for a plurality of numerical constants, which is also known as a system of equations. Solving for the numerical constants includes repeating the aforementioned method a multitude of times. That is, each of the iterations is executed in order to solve the algebraic equation with a corresponding constant from the numerical constants as one side of the algebraic equation. Similar to solving for one numerical constant, an initial iteration from within the plurality of iterations includes identifying the origin tooth as the current tooth and beginning the plurality of iterations from the origin tooth. An arbitrary iteration from the plurality of iterations is defined as any iteration other than the initial iteration, while the previous iteration is defined as the iteration that is executed prior to the arbitrary iteration. Solving for the numerical constants requires identifying the target tooth of the previous iteration as the current tooth of the arbitrary iteration. Consequently, the primary cog is not zeroed before each iteration. For example, once the target tooth of each numerical constant has been aligned to the fixed pointer, then a solution is identified for the algebraic equation. An optimal solution in this example is achieved when a plurality of collective rotations is minimized during the iterations. The plurality of collective rotations is defined as the summation of the rotations executed by each of the secondary cogs during each iteration.

When solving the algebraic equation for more than one numerical constants (e.g. a system of equations), the input entry device 200 allows for constraints in the manner that a user solves for potential solutions. The present disclosure provides a plurality of constraining categories, each of which is associated with a priority rank. The constraining categories are used to guide the steps taken by the user to solve the algebraic equation with the present disclosure. Each numerical constant is assigned to a designated category from the plurality of constraining categories. This allows the system 100 to constrain an execution sequence for the plurality of iterations in accordance to the priority rank of the corresponding constant, and the priority rank is derived from the designated category of the corresponding constant. The execution sequence for the plurality of iterations provides the user with a guide to optimize the manner in which to solve for the potential solutions of the algebraic equation.

Essentially, the execution sequence prompts the user to align the fixed pointer to one category of target teeth before aligning the fixed point to another category of target teeth. The plurality of constraint categories places restrictions on the manner on how the present disclosure can be used to solve the algebraic equation, similar to how a system of equations can be solved in multiple ways but is still mathematically constrained. The algebraic equation may but need not contain only whole numbers. Also, in some embodiments, a sequential turn limit may be applied to each of the secondary cogs in order to indicate the number of rotations by a secondary cog has exceeded the most optimal solution by a significant amount. Consequently, the plurality of rotations with each of the secondary cogs 2 may not exceed the sequential turn limit.

In the illustrated embodiment, the input entry device 200 is implemented in the form of a physical apparatus. The physical apparatus 200 includes a multitude of gears and a support structure 202. The primary cog and the secondary cogs are expressed by the gears. The gears are rotatably mounted to the support structure 202, e.g., on rotatable spindles provided thereon as shown in FIG. 14, and are positioned as described herein. The user 236 may rotate the secondary cogs 2 (individually labeled A, B, and C for illustration) in order to identify the solution to the algebraic equation. That is, in this example, to find a solution to an algebraic equation presented to the user 136, the user 136 must physically rotate the secondary cog(s) A, B, and/or C. And, each rotation of each secondary cog may be a physical action that may be recorded by the structure 102 and evaluated thereby to determine the pros and cons of the solution chosen by the user 136. The user input may be communicated over the network 104A to the structure 102. For example, if the user 136 rotates the secondary cog A once clockwise and the secondary cog C twice counterclockwise, each of these inputs may be communicated to the structure 102 and evaluated by the software 114 as discussed herein.

In an embodiment, the adaptive engine 126 may present the problem to the user 136 via the input/output device 109 (e.g., a display). The user 136 may attempt to solve the problem displayed on the display 109 by physically rotating one or more secondary cogs 2 of the input entry device 200. The adaptive engine 126, e.g., the evaluator 124 thereof, may evaluate these inputs to determine whether the user 136 provided the optimal solution to the problem. If so, the adaptive engine 126, using e.g., the performance module 152, may present to the user 136 via the input/output device 109 a suitable problem 127 from a different teaching topic. Conversely, if the evaluator 124 evaluates the user input and determines that the solution provided by the user 136 is a solution other than the optimal solution, the subsequent suitable problem 127 presented to the user 136 may be from the same teaching topic. The difficulty rank of the problems presented to the user 136 may be increased or decreased by engine 126 in line with the user input. And, as discussed above, the difficulty rank assigned to a particular problem may further be adaptively modified based on the inputs received by a statistically significant number of users.

Additional detail is now provided to illustrate how the input entry device 200 may be used to solve a problem—in this case, an algebraic equation—presented to the user 136 by the adaptive engine 126 via the input/output device 109.

As can be seen in FIG. 14, the secondary cog A of the example input entry device 200 has three teeth. Secondary cog B has five teeth. And secondary cog C has seven teeth. The primary cog 1 has 40 teeth. The target tooth 5 is seven teeth away from the origin tooth 4 (i.e., counting clockwise from the origin). Based on the configuration of the primary cog and the secondary cogs, FIG. 1 may be represented by the following equation:

$$3x+5y+7z=7 \quad\quad [[\text{Eq.}1]]$$

where the 3 in 3x refers to the number of teeth in secondary cog A, the 5 in 5y refers to the number of teeth in secondary cog B, the 7 in 7z refers to the number of teeth in secondary cog C, and 7 at the right hand side of the equation refers to the position of the target tooth of the primary cog relative to the origin tooth. The variable x refers to the number of rotations of cog A (clockwise is positive and counter clockwise is negative), as also discussed herein. The variable y refers to the number of rotations of cog B. And variable z refers to the number of rotations of cog C. The goal in this example is to rotate the primary cog so that the target tooth lands beneath the marker 3.

The artisan will appreciate that equation 1 has numerous solutions. And each of these solutions helps provide insight into the problem solving prowess of the user 136. For example, a student Sam can use the input entry device 200 of FIG. 14 to solve Equation 1 as follows. Sam may physically rotate cog C clockwise once. If cog C is rotated once in the clockwise direction, because it has seven teeth that are enmeshed with the primary cog 1, the primary cog will move seven teeth counterclockwise. This would leave the target tooth below the marker 3. In terms of the symbolic equation, since cog A is not rotated, the value of x is zero. Similarly, since cog B is not rotated, the value of y is zero. And because cog C is rotated once, the value of z is 1. This provides one way to solve Equation 1.

x=0, y=0, z=1; [[ Sam's approach]]

*i.e.,* 3(0)+5(0)+7(1)=7.

But, Equation 1 can also be solved in other ways. For example, a student Shelly may rotate cog B clockwise two times, and then rotate cog A counter-clockwise once. That too will result in the target tooth landing beneath the marker 3. In terms of symbols:

x=−1, y=2, z=0; [[ Shelly's approach]]

*i.e.,* 3(−1)+5(2)+7(0)=7.

Both the solutions above are correct. But, in this example and as noted above, the optimal solution is achieved by minimizing the collective rotation of the secondary cogs. Sam's solution above required one step whereas Shelly's solution required two. Therefore, if this data set were the only data set available, the system 100 may determine that Sam is more proficient at solving algebraic equations than Shelly. Therefore, if the suitable problem 127 to be presented to each of Sam and Shelly were an algebraic equation, the adaptive engine 126 may subsequently present an algebraic problem to Sam whose difficulty rank is greater than the difficulty rank of the algebraic problem presented to Shelly.

Indeed, the steps that the user 136 takes with the input entry device 200 (and other such input entry devices) may provide much insight into the user's problem solving abilities with respect to the teaching topic to which the problem belongs. Consider FIG. 14 again, but now assume that secondary cog C is omitted. As will become clear from the discussion herein, the representative equation would then be:

$$3x+5y=7 \quad\quad [[\text{Eq. }2]]$$

Assume that Sam solves Equation 2 by rotating cog B clockwise two times and cog A counter-clockwise once (i.e., x=−1 and y=2). This would be the most efficient solution to Equation 2. However, to solve Equation 2 in this manner, Sam must know that 2×5=10. That is, if Sam solves Equation 2 in the manner just described, the adaptive engine 126 may determine that Sam understands at least the basics of multiplication operations. The system 100 may therefore chose as a suitable problem (i.e., the problem subsequently presented to Sam) a more complex problem involving multiplication or a problem in a different teaching topic (e.g., division).

Assume now that Sam solves Equation 2 a different way. For example, assume Sam solves Equation 2 by rotating cog B clockwise once, rotating cog A counter-clockwise once, and then by rotating cog B clockwise once again. This particular solution indicates that Sam is not proficient at multiplication because he used only addition and subtraction to solve Equation 2. In this case, the adaptive engine 126 may subsequently present to Sam a different problem (e.g., a problem in which the complexity of the addition is increased or a problem in which the complexity of the multiplication is decreased). In this way, thus, the system 100 may continually evaluate the progress of the user 136 and present to him or her problems that challenge the abilities of the user 136 while ensuring that the user 136 is within his ZPD.

In embodiments, the physical input entry device 200 may be configurable by the user 136. For instance, and with respect to the input entry device 200 described as an example herein, the user 136 may be allowed to add or subtract gears from the device 200 (e.g., the support structure 202 may allow for the user 136 to: rotatably couple additional secondary gear(s) to the primary gear; remove one or more secondary gears; add or remove one or more teeth from the primary gear and/or the secondary gear; use a differently sized primary gear, etc.). Such selective configurability of the physical input entry device 200 may further increase the versatility of the system 100. Other input entry devices (e.g., device 300, device 700, etc.) discussed herein may likewise be selectively configurable.

Figure 15:
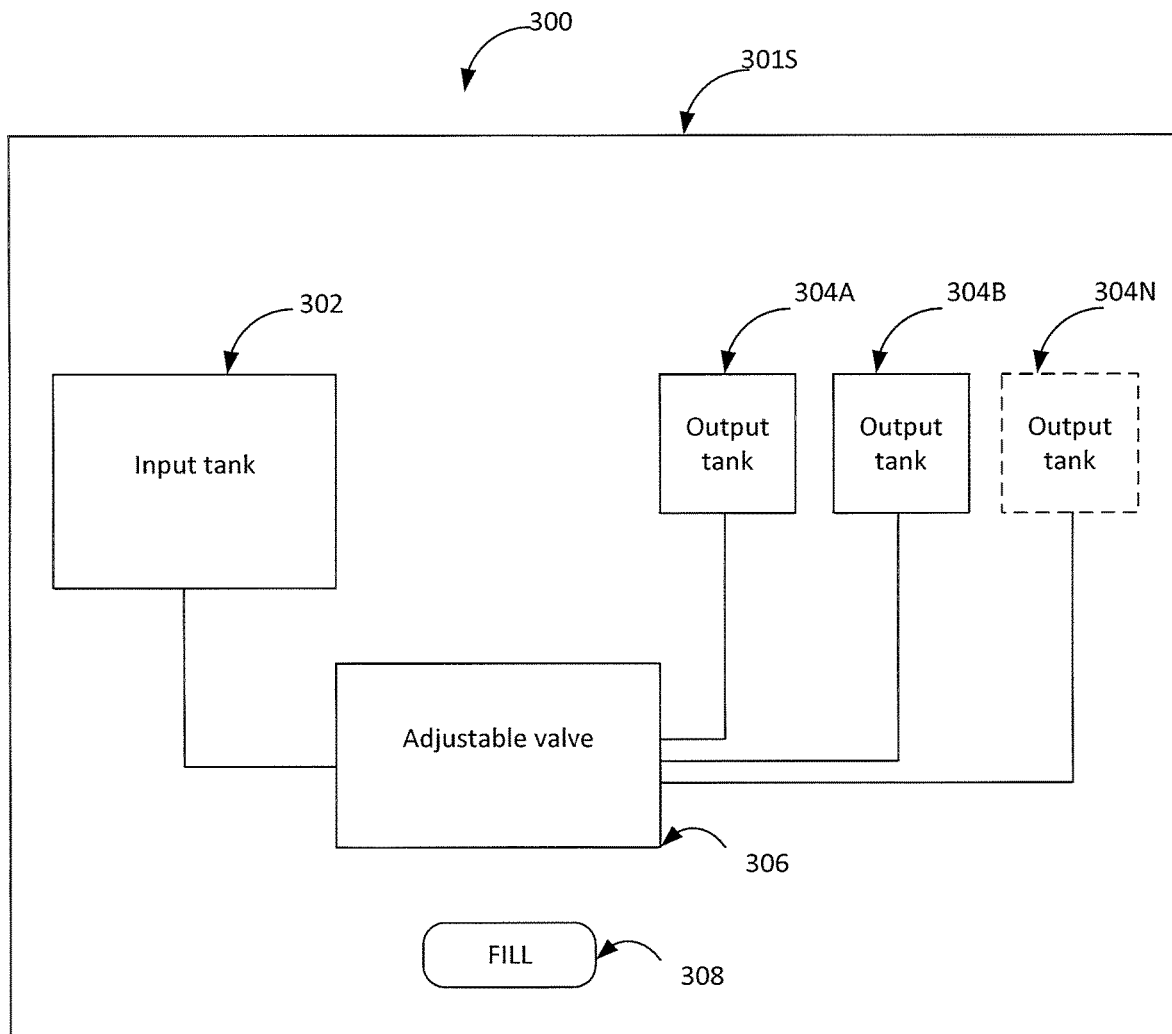
FIG. 15 is a schematic representation of another example physical input entry device of the system of FIG. 13, here a liquid flow instructional system, in an embodiment.

The artisan will appreciate from the disclosure herein that the gear system 200 is but one example of the input entry device 134, and other input entry devices for use with the adaptive system 100 for teaching content are also contemplated. FIG. 15, for instance, shows another example 300 of the input entry device 134. The input entry device 300 may also be referred to herein as a liquid flow instructional device 300.

The disclosure relating to the liquid flow instructional device 300 includes a method for representing a proportions problem and a method for solving the proportions problem. The method for representing the proportions problem utilizes the liquid flow instructional device 300 to express the proportions problem in a non-traditional fashion. The method for solving the proportions problem defines the steps necessary to determine a set of values that solves the proportions problem using the liquid flow system 300, essentially identifying a solution to the proportions problem. The liquid flow instructional system 300 physically and visually represents each entity of the proportions problem (or purely visually in the case of a digital implementation as described herein) and allows the user to manipulate said entities through an adjustable valve 306 of the liquid flow system 300 to determine a solution to the proportions problem. Entities of the proportions problem may include a number, a plurality of numbers, a geometric shape (circular disk, rectangle, or other regular shape), etc.

In more detail, the liquid flow instructional device 300 may include a support structure 301S onto which a plurality of tanks and/or other containers configured to retain fluid are situated (e.g., mounted). The plurality of tanks may include one or more input tanks and a plurality of output tanks (e.g., two, three, or four or more output tanks, etc.). For example, in the example illustrated in FIG. 15, the liquid flow instructional device 300 includes an input tank 302 and output tanks 304A, 304B, and 304N. Each of the input tanks 302 and the output tanks 304A, 304B, and 304N may have a pre-determined capacity which may be displayed thereon or elsewhere. Each of the input tank 302 and the output tanks 304A, 304B, and 304N may be fluidly and selectively coupled to each other. For example, a pipe may connect the input tank 302 to the valve 306, and a plurality of pipes may connect the valve 306 to the plurality of output tanks. Thus, the adjustable valve 306 may selectively and fluidly couple the input tank 302 to the output tanks 304A, 304B, and 304N.

A user controlled binary switch, e.g., the fill button 308 communicatively coupled to the valve 306, may initiate on user command selective flow of the liquid from the input tank to the plurality of output tanks. The initial state of the input tank 302 may be full (i.e., the input tank 302 is full when a puzzle is presented to the user (e.g., user 136)). The initial state of the output tanks 304A, 304B, and 304N when the puzzle launches may be empty. The initial position of the switch 308 may be off. The user may selectively manipulate the amount of liquid that flows from the input tank 302 to each of the output tanks 304A, 304B, and 304N via the adjustable valve 306, and more specifically, via movable arms (e.g., rotatable arms, slidable arms, etc.) thereof. When the arms of the valve 306 have been set by the user as discussed herein, the user may set the switch 308 to on, whereupon the entire contents of the input tank 302 may flow first to the valve 306, and then to the plurality of output tanks 304A-304N as determined by the valve settings. Upon completion of the flow, the switch 308 may automatically re-set to off and the input tank may automatically refill. When the puzzle requires a multi-step solution, as discussed herein, the initial state of the output tanks at the start of any step may be the end-state of the previous step.

In embodiments, the input tank 302 (and/or output tanks 304A, 304B, and 304N) may be fluidly coupled to a water source, such as a faucet, a water body, etc. to allow various amounts of fluid to be filled in differently sized input tanks 302. As discussed herein, the adjustable valve 306 may allow the user to selectively apportion liquid from the input tank 302 into the output tanks 304A, 304B, and 304N. In embodiments, and as discussed below, the adjustable valve 306 may have a plurality of arms (e.g., up to four arms) which the user may use to selectively apportion the liquid from the input tank 302 into the two or more output tanks 304A, 304B, and 304N. The liquid flow instructional device 300 may comprise a fill button 308 or other activation means, which, when employed by the user 136, may initiate fluid flow from the input tank 302 to the one or more output tanks 304A, 304B, and 304N in line with the adjustable valve 306 settings set by the user. The user's objective may be to use the adjustable valve 306 to apportion liquid from the input tank 302 to the output tanks 304A, 304B, and 304N so as to exactly fill each of the output tanks 304A, 304B, and 304N without spillage. In puzzles requiring multi-step solutions, as will become clear from the disclosure herein, the fill button 308 may have to be employed two or more times by the user to solve the puzzle. In embodiments, e.g., where the physical input entry device 300 is being used, the input entry device 300 may include means (e.g., pump(s), siphons, gravity fed devices, etc. (i.e., sensing devices 134A and/or responsive devices 134B (see FIG. 13))) to cause the liquid to flow from the input tank 302 into the output tanks 304A, 304B, and 304N in line with the adjustable valve settings set by the user. In embodiments, the input entry device 300 may be a modular device such that the size and/or number of input and output tanks may be varied to create new puzzles. The size of the input tank 302 may but need not be the same as the size of the output tanks 304A, 304B, and/or 304N, and the output tanks may likewise have different sizes. In embodiments, the size of the output tanks 304A, 304B, and 304N may be the same but indicia may be provided to indicate that a different amount of liquid is to be filled in each output tank to solve the puzzle. In embodiments, a volume of the input tank 302 may be one of: (a) equal to a collective volume of the plurality of output tanks 304A, 304B, and 304N; and (b) a multiple of the collective volume of the plurality of output tanks 304A, 304B, and 304N. The phrase "collective volume" indicates the actual collective volume of the output tanks and/or the collective volume thereof as indicated thereon or elsewhere.

Figure 16A:
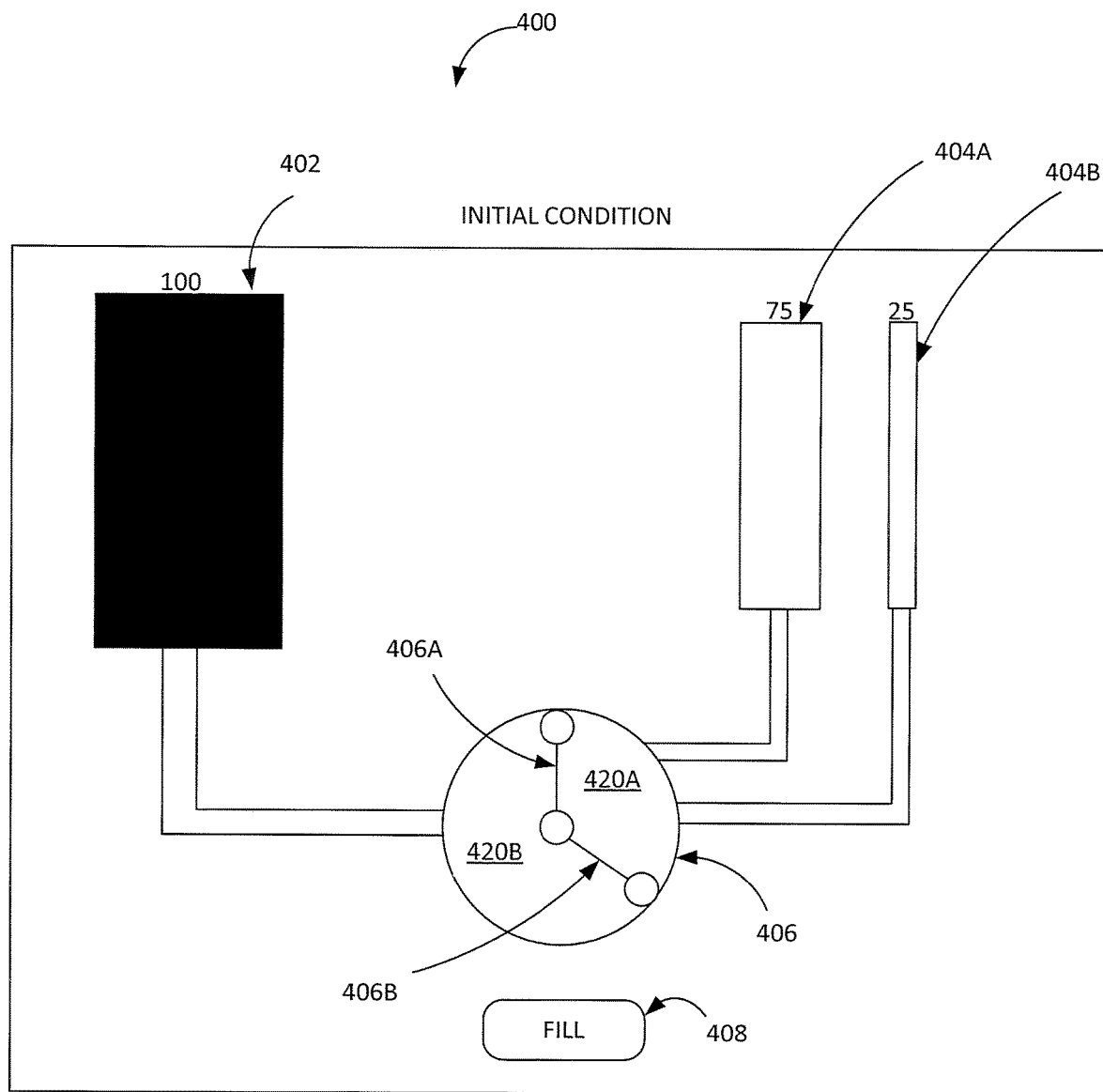
FIGS. 16A-16C illustrate a puzzle being represented and solved using the liquid flow instructional system of FIG. 15.

FIG. 16A shows an example liquid flow instructional device 400. The liquid flow instructional device 400 is substantially similar to the liquid flow instructional device 300, except as specifically noted and/or shown, or as would be inherent. Further, those skilled in the art will appreciate that the embodiment 300 (and thus the embodiment 400) may be modified in various ways, such as through incorporating all or part of any of the various described embodiments, for example. For uniformity and brevity, corresponding reference numbers may be used to indicate corresponding parts, though with any noted deviations (for example, the input tank is designated 302 in FIGS. 15 and 402 in FIG. 16A, adjustable valve is designated 306 in FIGS. 15 and 406 in FIG. 16A, etc.). The artisan will appreciate from the disclosure herein that the configuration of the liquid flow instructional device 400 is one of the many possible configurations of the liquid flow instructional device 300. In embodiments, the liquid flow instructional device 400 is an example of the liquid flow instructional device 300.

Figure 16B:
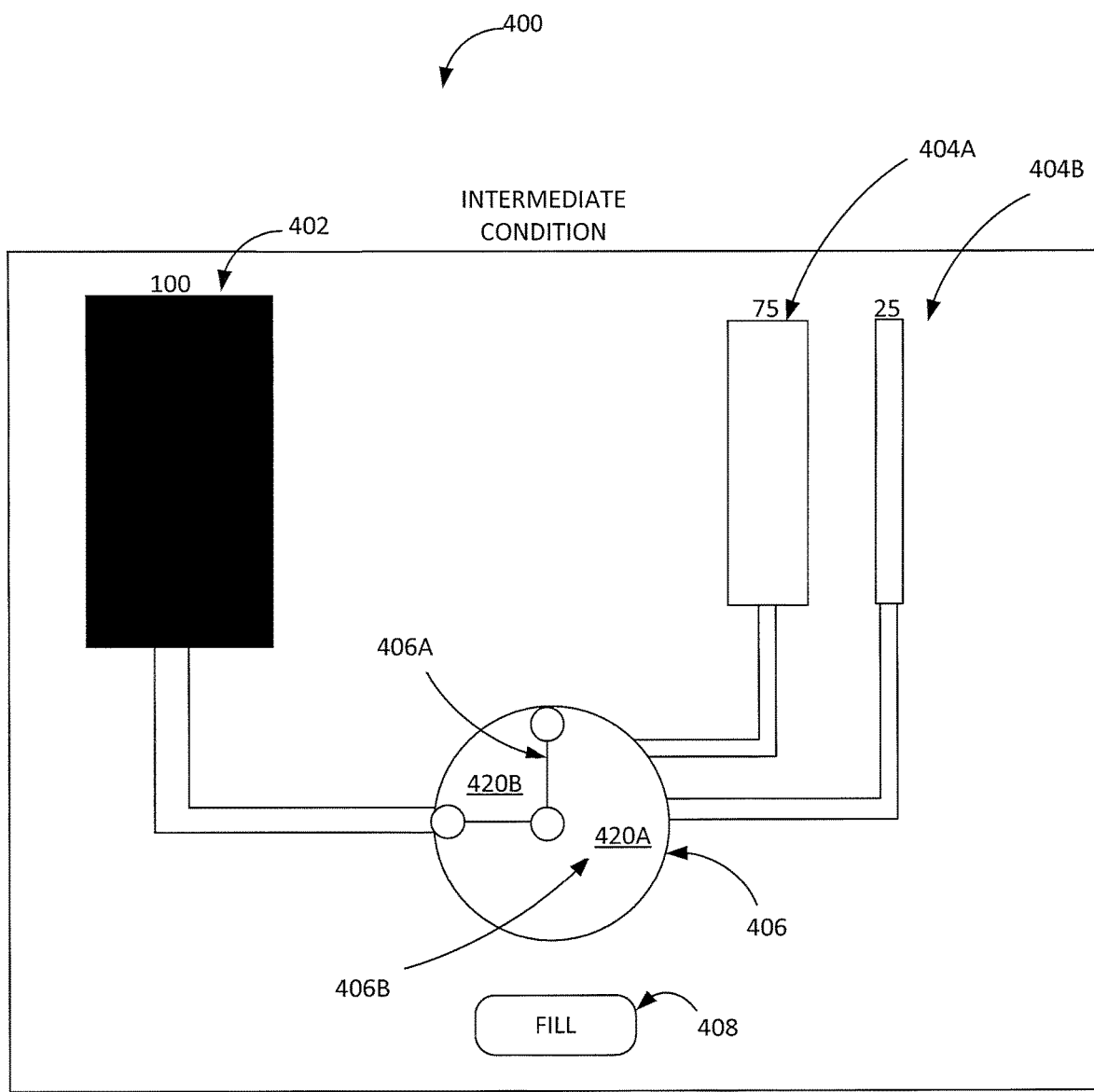
Figure 16C:
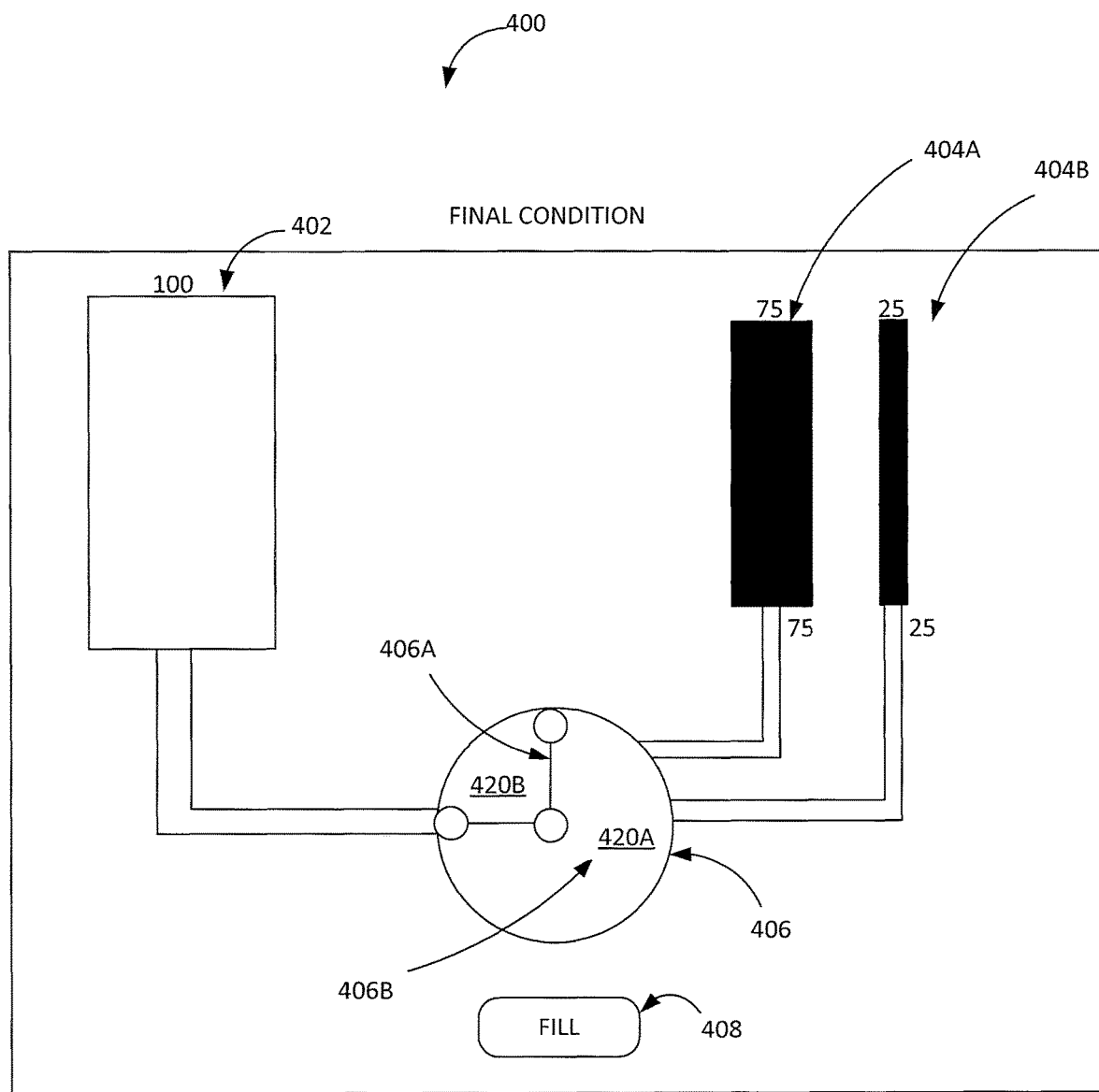

In more detail, FIG. 16A shows the liquid flow instructional device 400 in an initial condition (i.e., presenting a puzzle to the user), FIG. 16B shows the liquid flow instructional device 400 in an intermediate condition (i.e., where the user has employed the adjustable valve 406 to selectively apportion the liquid from the input tank 402 to the output tanks), and FIG. 16C shows the liquid flow instructional device 400 in a final condition (i.e., after the user has interacted with the fill button 408 to cause the liquid to flow from the input tank 402 to the output tanks 404A and 404B in line with the settings of the adjustable valve 406). The adjustable valve 406 may have arms 406A and 406B that may allow the user to selectively define valve regions (or valve face areas) 420A and 420B on the valve face. The valve face region 420A, in this example, may correspond to the output tank 404A and the valve face region 420B may correspond to the output tank 404B. This correspondence may be indicated by color coding (e.g., all or part of each of the valve face region 420A and the output tank 404A associated therewith may be red in color) or other means (such as by numerical identification or using another visible indicator). In this example, the input tank 402 has 100 units (e.g., mL, quarts, cups, gallons, etc.) of liquid. The output tanks 404A and 404B are currently empty, and the goal here is to use the arms 406A and 406B of the adjustable valve 406 to apportion the liquid from the input tank 402 such that 75 units thereof end up in the output tank 404A and 25 units thereof end up in the output tank 404B. Specifically, the goal is to selectively configure the valve regions 420A and 420B so as to exactly fill the output tanks 404A and 404B in a minimum number of attempts. As shown, the output tanks 404A and 404B have a capacity of 75 units and 25 units, respectively.

The artisan will appreciate from the disclosure herein that the problem represented in FIG. 16A is a proportions problem. A typical proportions problem may be: given a number N, and numbers $M_1, \ldots, M_k$, find numbers $R_1, \ldots, R_k$ such that $R_1 + \ldots + R_k = 1$ and $R_i \times N = M_i$, for each i. For example, if N=200, k=3, $M_1$=70, $M_2$=80, and $M_3$=50, then a successful solution is to take $R_1$=0.35, $R_2$=0.40, and $R_3$=0.25, since 0.35+0.40+0.25=1 and 0.35×200=70, 0.4×200=80, and 0.25×200=50. In the example shown in FIG. 16A, N=100, k=2, M1=75 and M2=25, so a successful solution is to take R1=0.75 and R2=0.25. That is, the input tank 402 represents the given number N, the output tanks 404A, 404B, . . . 404$_k$ represent the numbers $M_1, \ldots, M_k$, and R1 and R2 represent the relative size of the valve regions 420A and 420B. The user may rotate or otherwise move the moveable valve arms 406A and 406B to divide the face of the valve 406 into regions 420A and 420B that represent the solution numbers $R_1, \ldots, R_k$. In some instances, the numbers $R_1, \ldots, R_k$ may be restricted to come from a specified collection; for example, fractions in the set $\{1/5, 2/5, 3/5, 4/5\}$, decimals in the set $\{0.20, 0.4, 0.6, 0.8\}$, etc.

FIG. 16B shows the liquid flow instructional device 400 after the user has properly configured the valve regions 420A and 420B to exactly fill up the output tanks 404A and 404B. While not expressly shown in FIG. 16B, and as discussed above, in embodiments the valve regions and the corresponding output tanks may be color coded (e.g., the region 420A and the output tanks 404A may each include a red or other identifier to indicate correspondence therebetween and the region 420B and the output tank 404B may each include a blue or other identifier to indicate correspondence between the region 420B and output tank 404B). In embodiments, indicia may be provided to indicate the ratio of the size of the region 420A to the size of the region 420B (e.g., in FIG. 16B, the fraction ¾ may be provided in region 420A and the fraction ¼ may be provided in the region 420B to indicate that the regions 420A and 420B respectively take up $3/4^{th}$ and $1/4^{th}$ of the total valve region). Alternately, the indicia may include percentages, decimals between zero and one, and/or other such indicators to indicate the relationship between the valve regions 420A and 420B and/or the size thereof. Indicia may also be provided to indicate the ratio of the volume of the output tank 404A to the volume of the output tank 404B.

Once the valve arms 406A and 406B are set up as shown in FIG. 16B, the user may depress or otherwise interact with the fill button 408. The flow button 408 may be communicatively coupled to the input tank 402 and/or the valve 406 (e.g., over a network, via a mechanical connection, etc.), such that interacting with the fill button 408 may initiate flow from the input tank 402 to the output tanks 404A and 404B. Thus, when the fill button 408 is depressed or otherwise interacted with, the liquid to flow from the input tank 402 to the output tanks 404A and 404B in line with the valve regions 420A and 420B set by the user. For instance, interacting with the fill button 408 may cause a pump or other liquid flow means to cause liquid to be pushed from the input tank 402 into the output tanks 404A and 404B.

FIG. 16C shows the liquid flow instructional device 400 in its final condition, after the valve regions 420A and 420B have been set by the user and the fill button 408 has been depressed. As can be seen in FIG. 16C, the liquid has flown from the input tank 402 to the output tanks 404A and 404B such that the output tanks are exactly filled (the phrase "exactly filled", as used herein, means that a tank is filled to capacity without spillage). Had the user configured the valve regions 420A and 420B differently, e.g., if the user had configured the valve regions such that the region 420A had an area equal to that of region 420B, output tank 404B would have overflown once the fill button 408 was depressed. As noted, the input tank 402 may be configured to be refilled immediately (or at another time) for the presentation of the next puzzle.

Figure 17A:
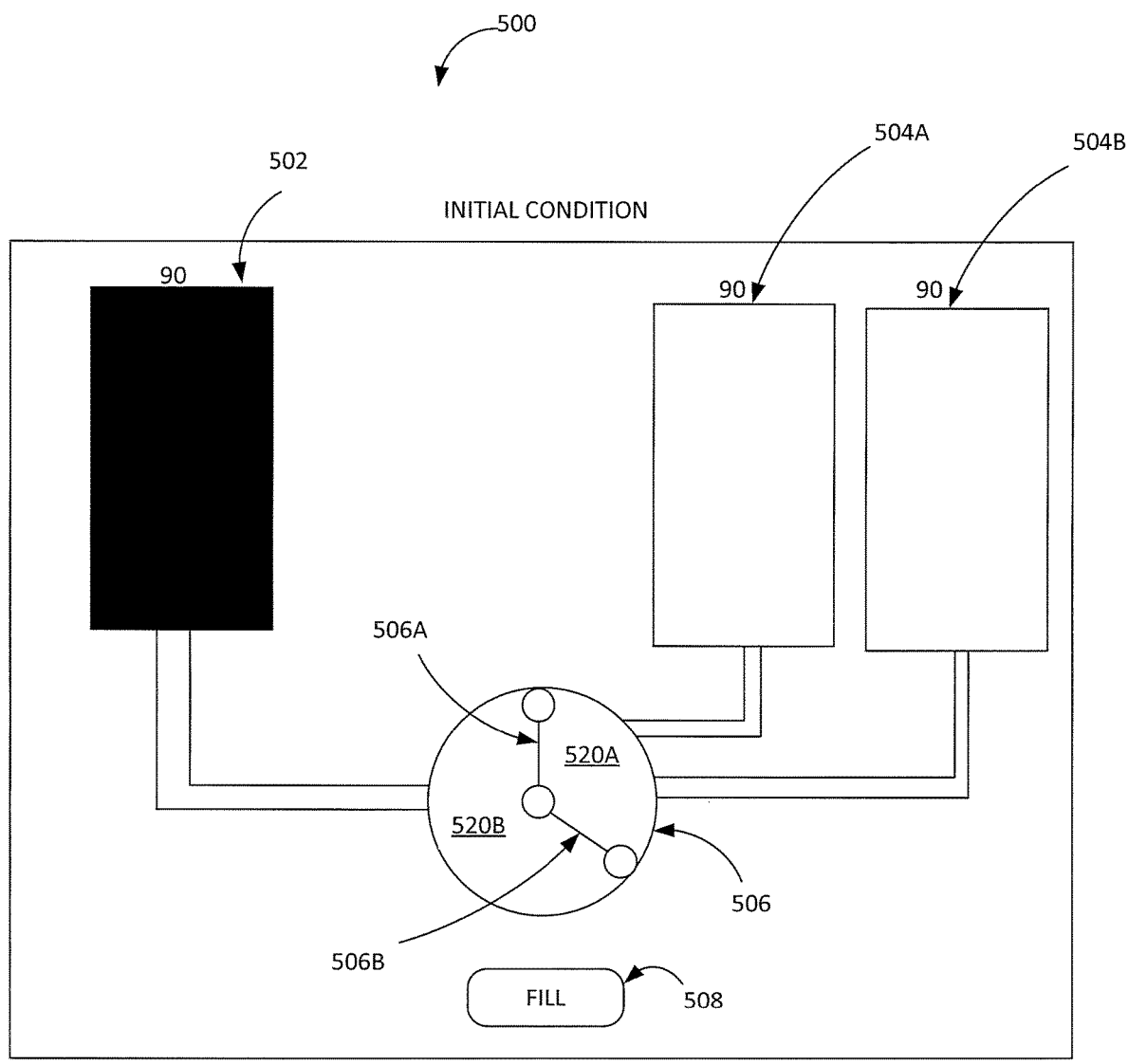
FIGS. 17A-17F illustrate another puzzle being represented and solved using the liquid flow instructional system of FIG. 15.

FIG. 17A shows an example liquid flow instructional device 500 to illustrate a more complex problem than that shown in FIG. 16A. The liquid flow instructional device 500 is substantially similar to the liquid flow instructional device 300 and 400, except as specifically noted and/or shown, or as would be inherent. Further, those skilled in the art will appreciate that the embodiment 500 may be modified in various ways, such as through incorporating all or part of any of the various described embodiments, for example. For uniformity and brevity, corresponding reference numbers may be used to indicate corresponding parts, though with any noted deviations (for example, the input tank is designated 302 in FIG. 15, 402 in FIGS. 16A-16C, and 502 in FIG. 17A; the adjustable valve is designated 306 in FIG. 15, 406 in FIGS. 16A-16C, and 506 in FIG. 17A, etc.). In use, and in line with the disclosure herein, the problem in FIG. 17A may be presented to the user after the user has solved the comparatively easier problem in FIG. 16A.

Figure 17B:
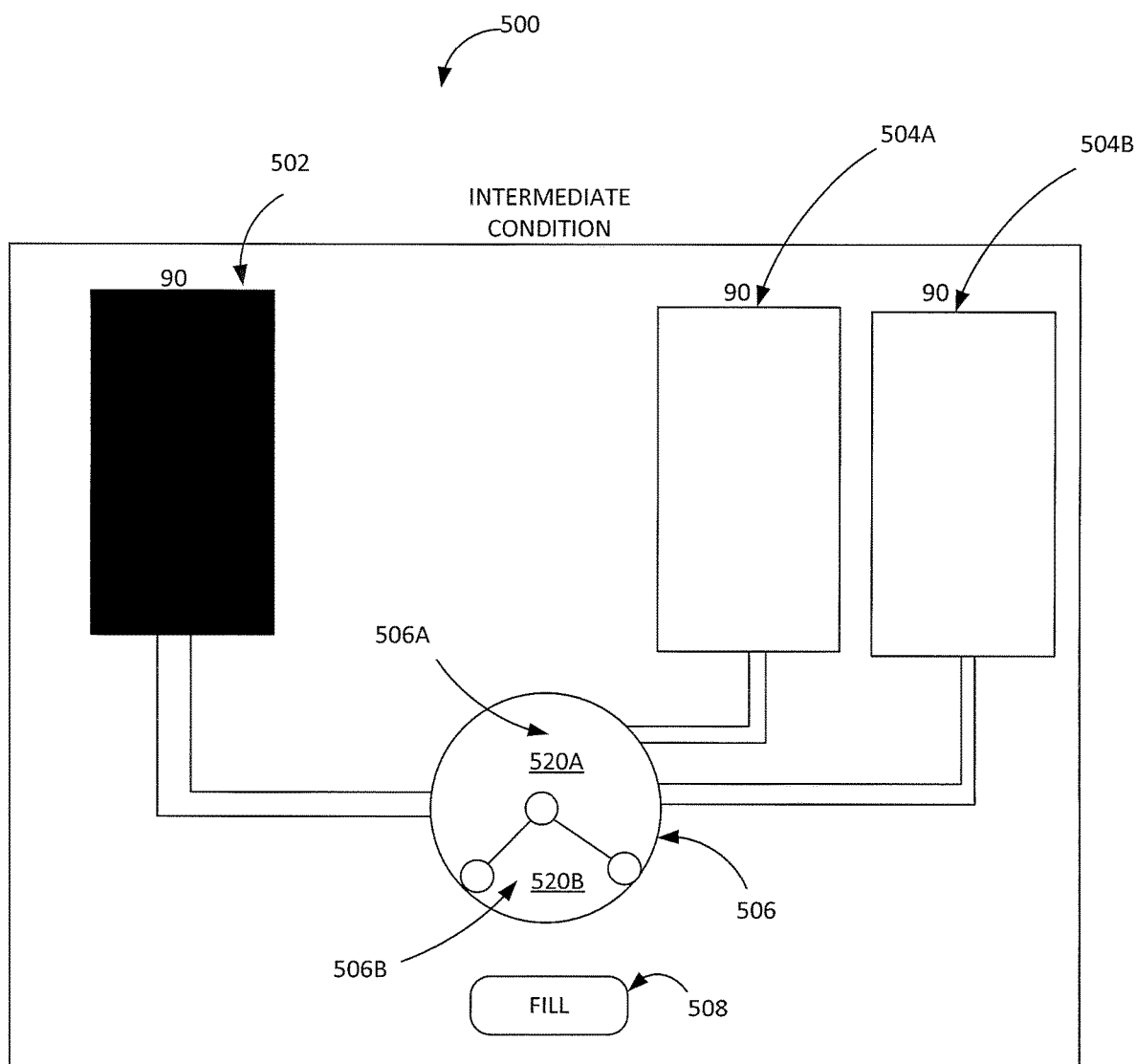
Figure 17C:
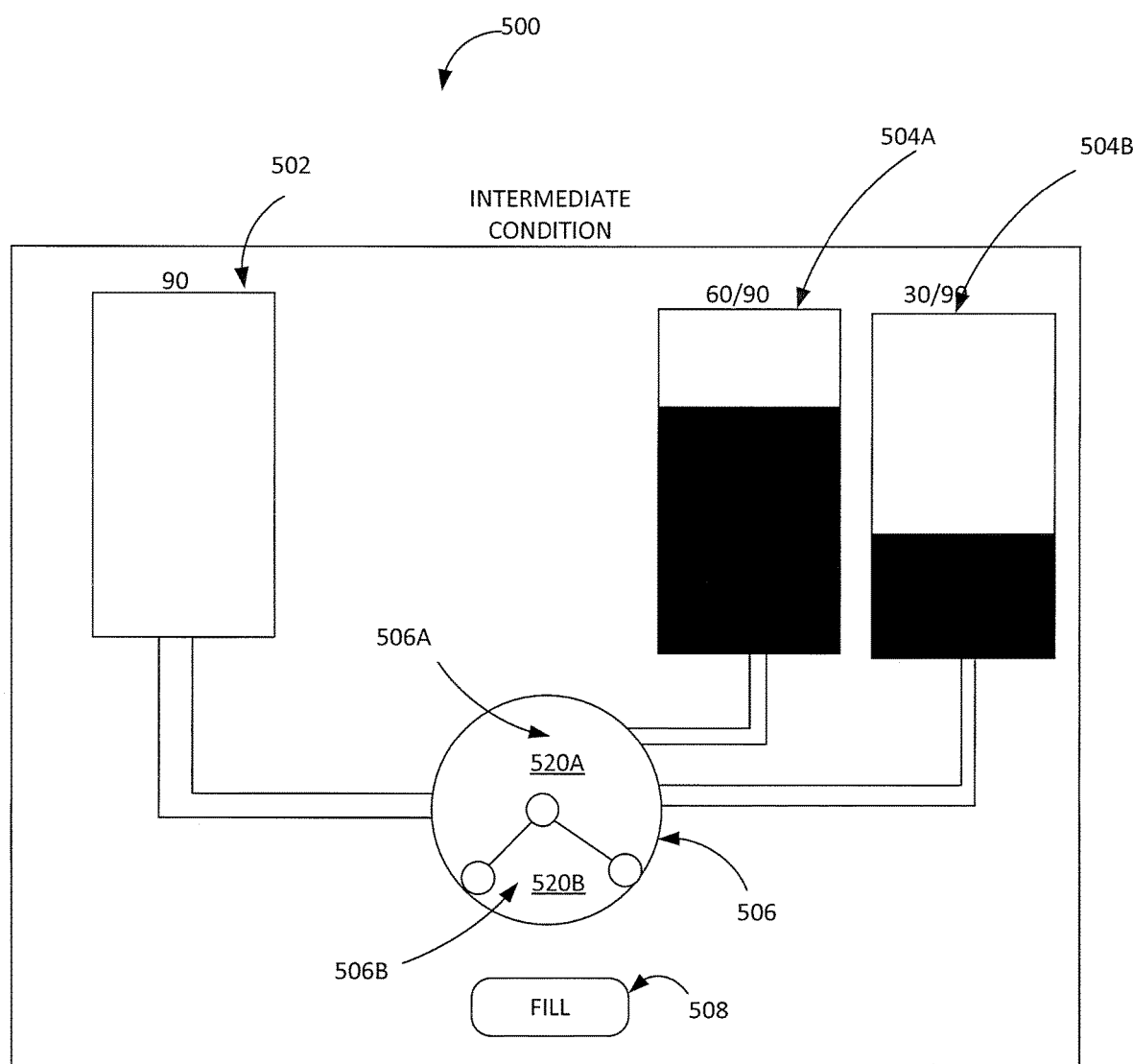
Figure 17D:
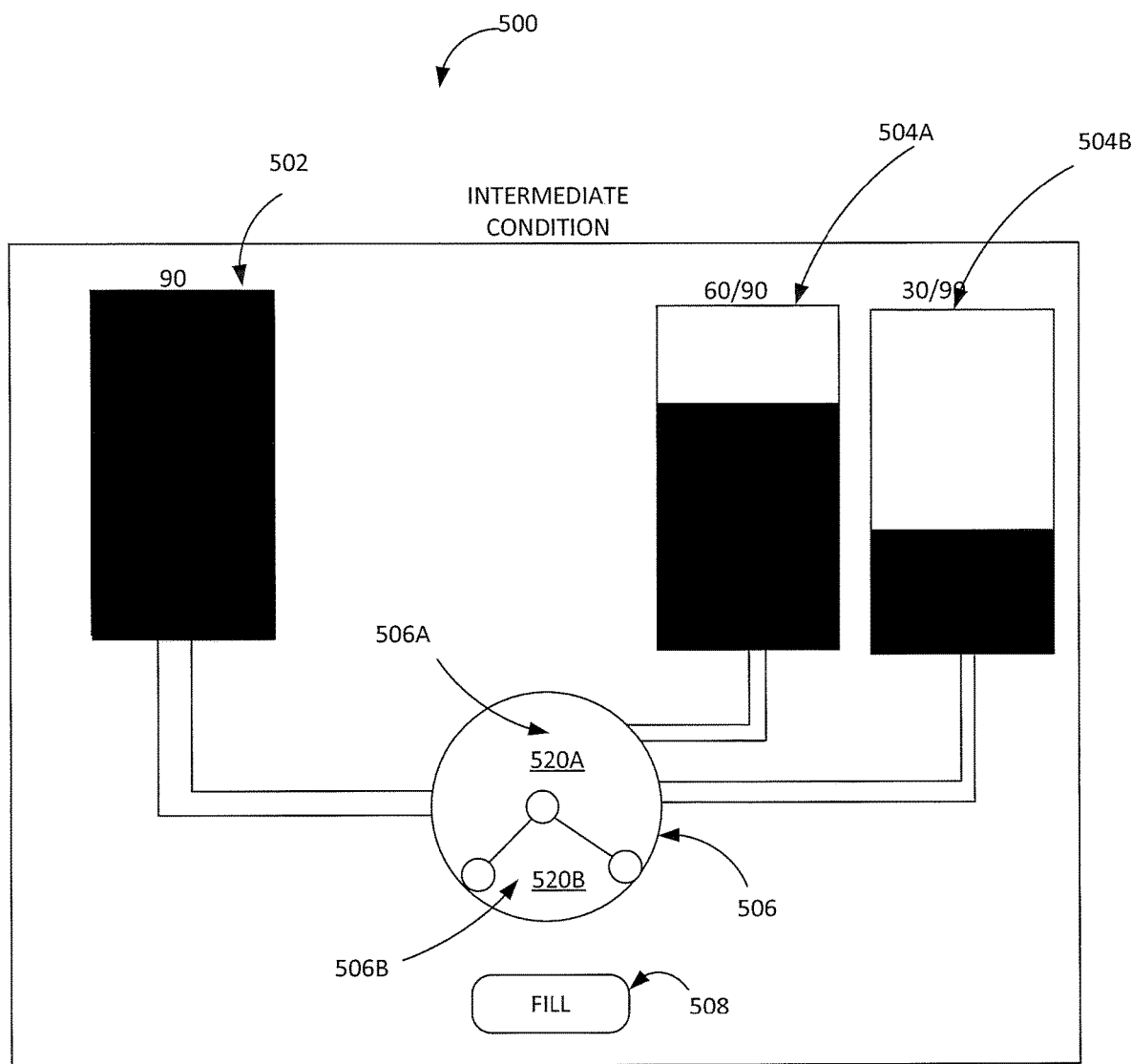
Figure 17E:
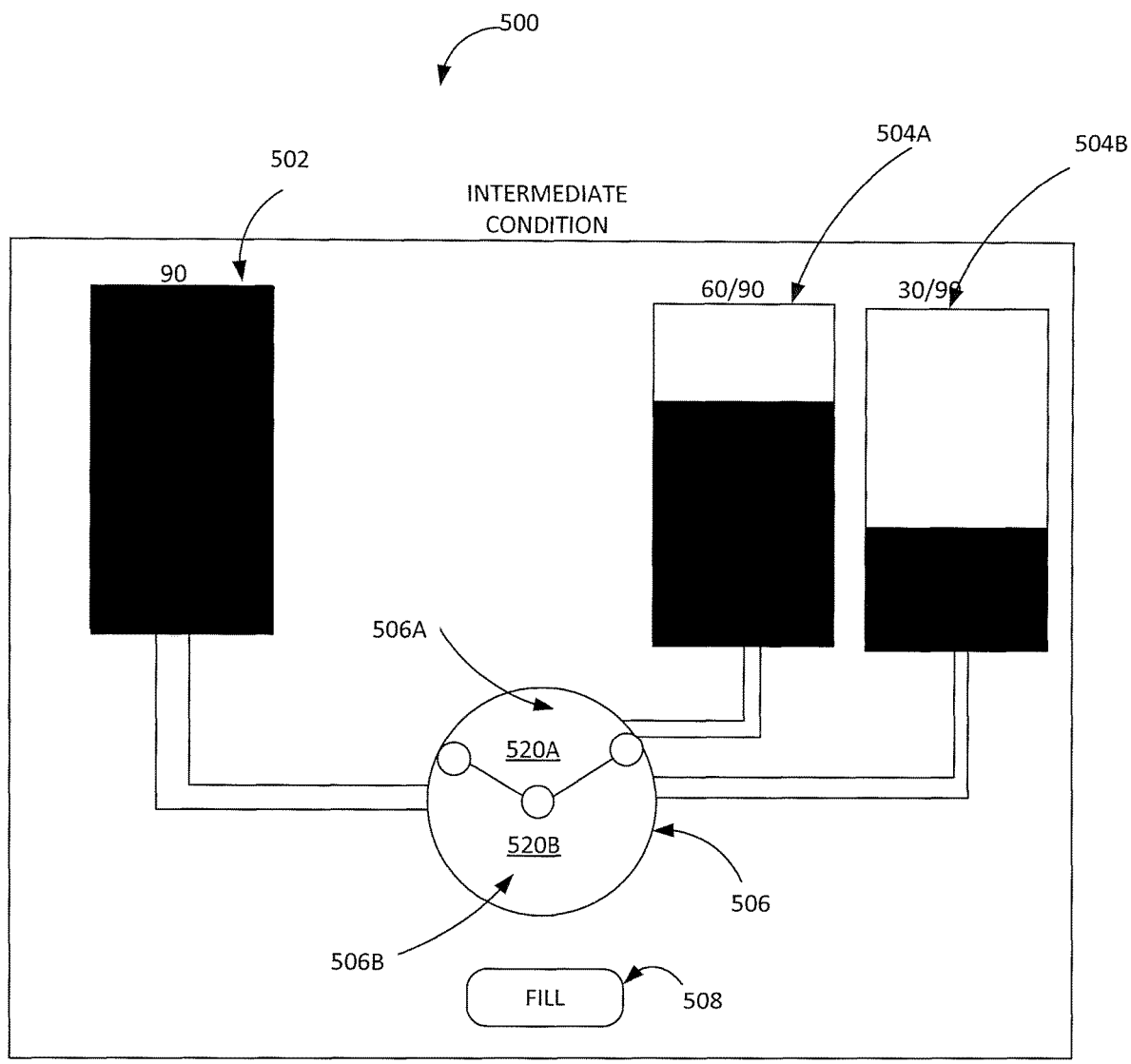
Figure 17F:
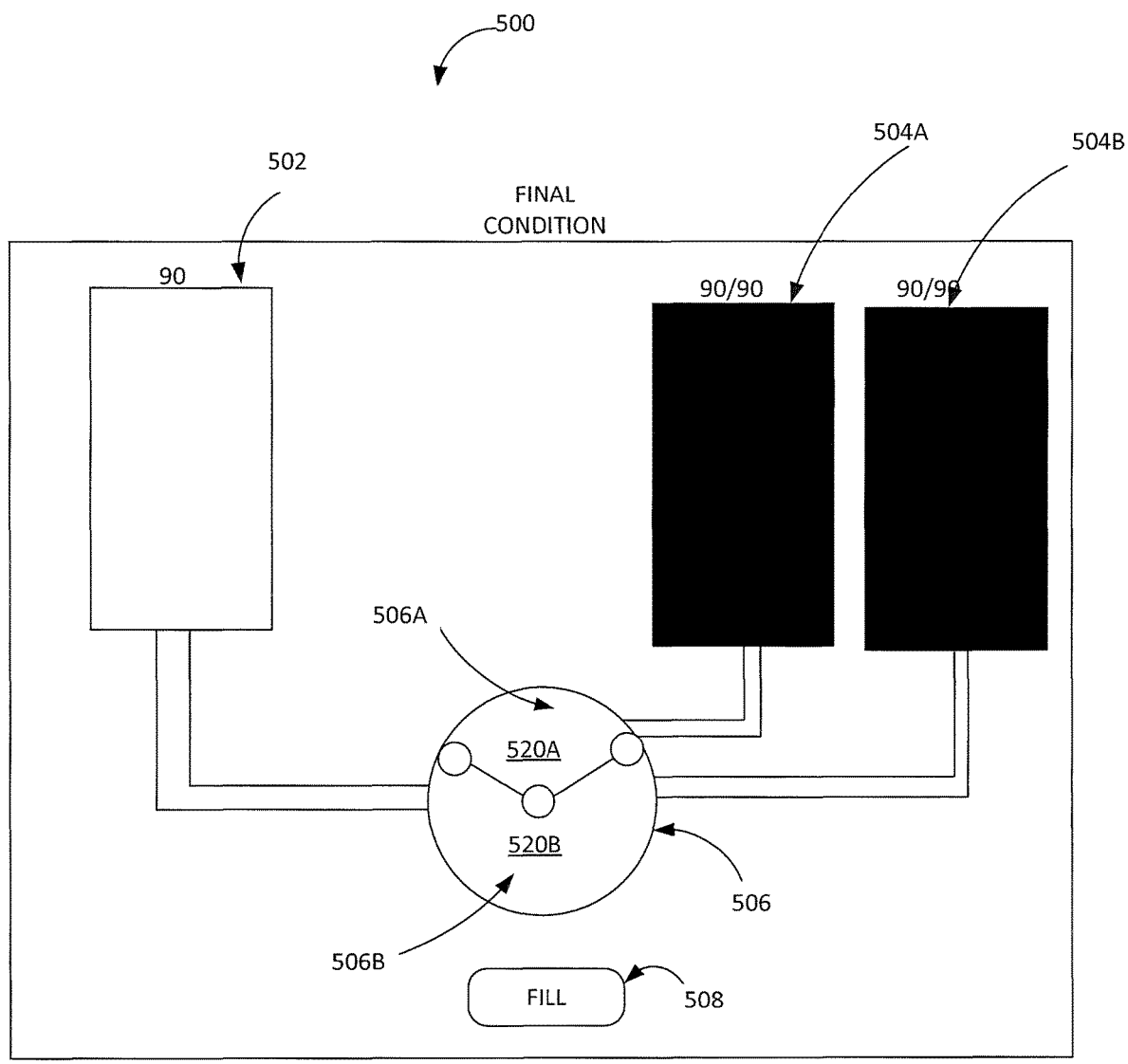

FIG. 17A shows the liquid flow instructional device 500 in an initial condition (i.e., presenting a puzzle to the user), FIG. 17B shows the liquid flow instructional device 500 in an intermediate condition (i.e., where the user has employed the adjustable valve 506 to apportion the liquid from the input tank 502 to the output tanks), FIG. 17C shows the liquid flow instructional device 500 in another intermediate condition (i.e., after the user has interacted with the fill button 508 to cause the liquid to flow from the input tank 502 to the output tanks 504A and 504B in line with the settings of the adjustable valve 506 but before the output tanks 504A and 504B are exactly filled, FIG. 17D shows the liquid flow instructional device 500 in another intermediate condition (i.e., after the input tank 502 is refilled), FIG. 17E shows the liquid flow instructional device 500 in yet another intermediate condition (i.e., after the valve areas 520A and 520B have been set by the user 136 for a second time), and FIG. 17F shows the liquid flow instructional device 500 in a final condition (i.e., after the fill button 508 has been depressed for the second time to complete the puzzle). In this example, the valve region 520A corresponds to the output tank 504A and the valve region 520B corresponds to the output tank 504B. The input tank 502 has 90 units of liquid, and can be refilled. The output tanks 504A and 504B are currently empty, and the goal here is to use the arms 506A and 506B of the adjustable valve 506 to apportion the liquid from the input tank 502 to exactly fill the output tanks 504A and 504B in a minimum number of attempts. Each of the output tanks 504A and 504B has a capacity of 90 units.

In the event that there are no numbers $R_1, \ldots, R_k$ such $R_1 + \ldots + R_k = 1$ and $R_i \times N = M_i$, for each i, completion of the puzzle may require two or more applications of the settings. This may be referred to as multi-step problem herein, which is solved by obtaining a series of partial solutions, all but the final solution being a partially complete configuration. The artisan will appreciate from the disclosure herein that the problem disclosed in FIG. 17A is a multi-step (specifically, a two-step) problem (i.e., the input tank having 90 units will need to be refilled once after the 90 units therein are transferred to the output tanks, because the output tanks 504A and 504B collectively require 180 units). Puzzles may likewise take a minimum of three or more steps to resolve.

FIG. 17B shows the first setting of the control valve 506, and FIG. 17C shows the results once the fill button 508 is first depressed. FIG. 17D shows the input tank 502 being refilled (which may, in embodiments, happen automatically), FIG. 17E shows the second setting of the control valve 506, and FIG. 17F shows the final result once the fill button 508 is depressed by the user the second time. In this way, the user may fill each of two 90 unit output tanks with a refillable 90 unit input tank in two tries (i.e., using the fill button 508 twice). In essence, FIGS. 17A-17F show the following:

Turn 1: Valve areas 520A and 520B take up $\frac{2}{3}^{rd}$ and $\frac{1}{3}^{rd}$ of the valve face, respectively; and Turn 2: Valve areas 520A and 520B take up $\frac{1}{3}^{rd}$ and $\frac{2}{3}^{rd}$ of the valve face, respectively.

The artisan will appreciate that the puzzle may likewise be solved in other ways, including in two (or a different number of) attempts. For example, the puzzle may he been solved as follows:

Turn 1: Valve areas 520A and 520B take up ½ and ½ of the valve face; and

Turn 2: Valve areas 520A and 520B take up ½ and ½ of the valve face.

Had the user taken more than two tries to solve this puzzle, the system 100 may have gleaned that the user does not have mastery over proportions problems and may have presented to him additional (e.g., easier) proportions puzzles to solve.

Figure 18A:
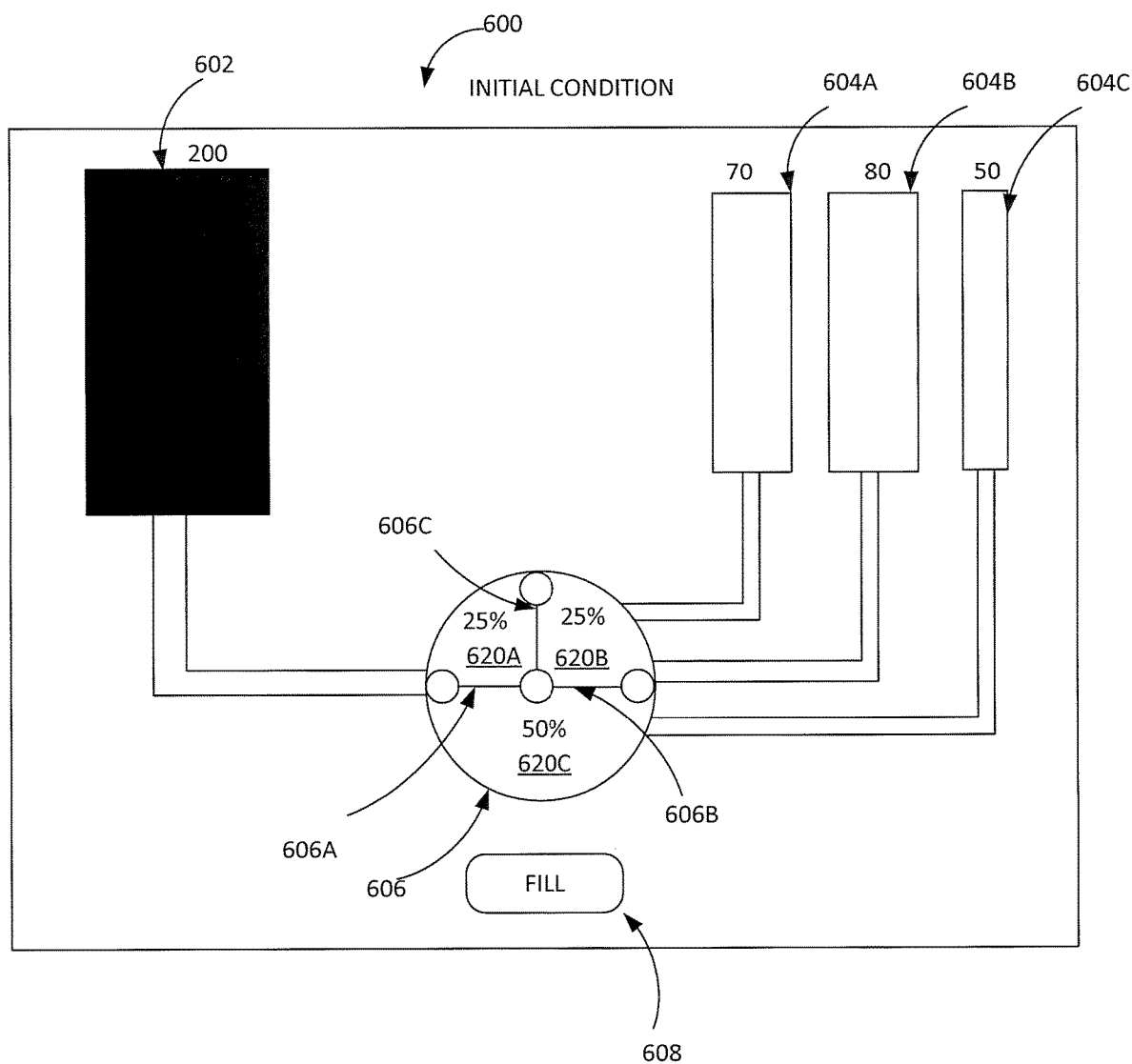
FIGS. 18A-18C illustrate yet another puzzle being represented and solved using the liquid flow instructional system of FIG. 15.

FIG. 18A shows an example liquid flow instructional device 600 to illustrate another problem, wherein the numbers $R_1, \ldots, R_k$ are indicated as percentages. The liquid flow instructional device 600 is substantially similar to the liquid flow instructional device 300, 400, and 500, except as specifically noted and/or shown, or as would be inherent. Further, those skilled in the art will appreciate that the embodiment 600 may be modified in various ways, such as through incorporating all or part of any of the various described embodiments, for example. For uniformity and brevity, corresponding reference numbers may be used to indicate corresponding parts, though with any noted deviations.

Figure 18B:
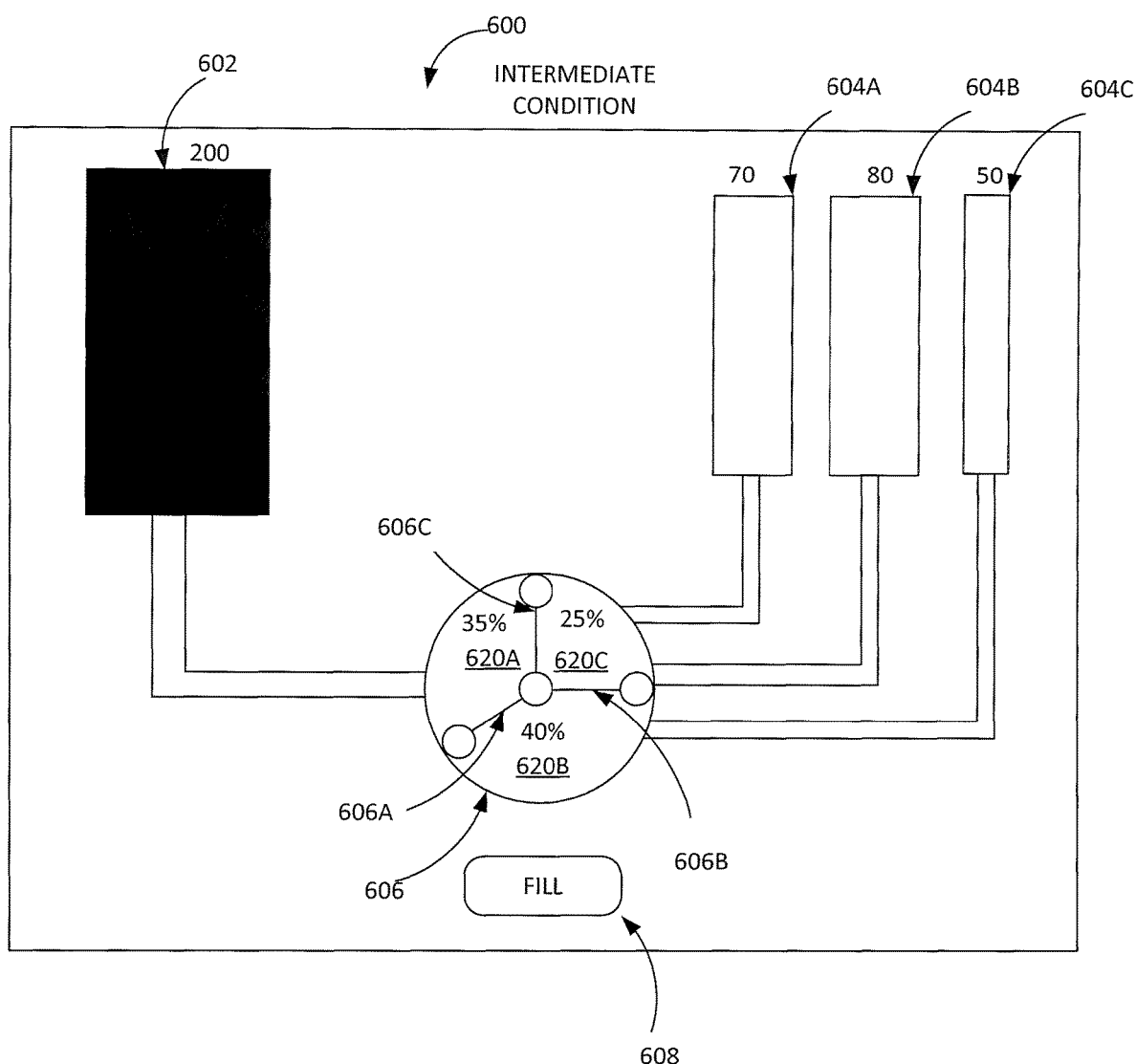

FIG. 18A shows the liquid flow instructional device 600 in an initial condition (i.e., presenting a puzzle to the user), FIG. 18B shows the liquid flow instructional device 600 in an intermediate condition (i.e., where the user has employed the adjustable valve 606 to apportion the liquid from the input tank 602 to the output tanks 604A, 604B, and 604C), and FIG. 17C shows the liquid flow instructional device 600 in a final condition (i.e., after the user has interacted with the fill button 608 to cause the liquid to flow from the input tank 602 to the output tanks 604A, 604B, and 604C in line with the settings of the adjustable valve 606). In this example, the valve region 620A corresponds to the output tank 604A, the valve region 620B corresponds to the output tank 604B, and the valve region 620C corresponds to the output tank 604C. The input tank 602 has 200 units of liquid, and can be refilled. The output tanks 604A, 604B, and 604C are currently empty, and the goal here is to use the arms 606A, 606B, and 606C of the adjustable valve 606 to apportion the liquid from the input tank 602 to exactly fill the output tanks 604A, 604B, and 604C in a minimum number of attempts. The output tanks 604A, 604B, and 604C have a capacity of 70 units, 80 units, and 50 units, respectively.

Figure 18C:
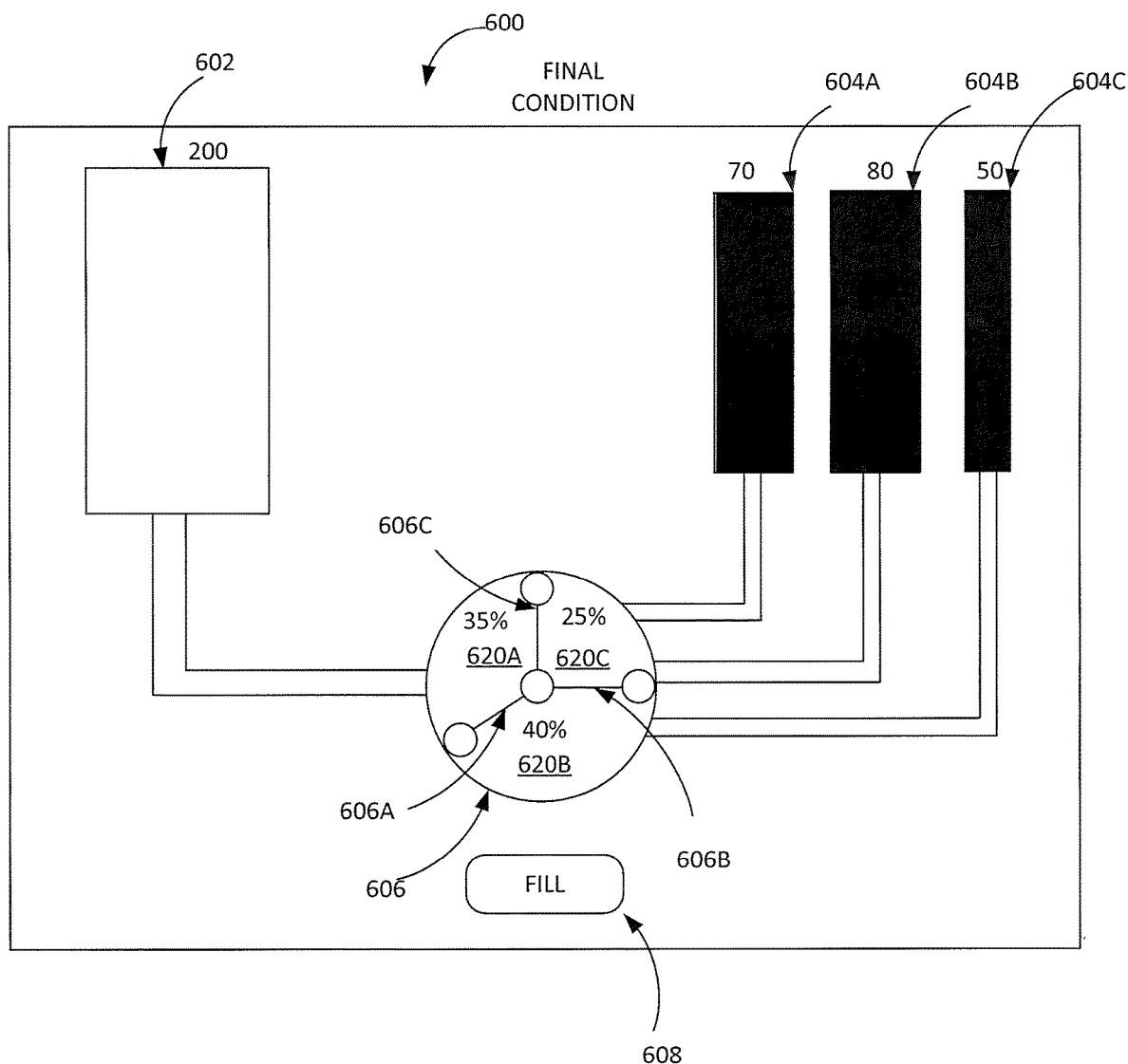

FIG. 18B shows the device 600 in the intermediate condition, after the regions 620A, 620A, and 620C have been set to cause the output tanks 604A, 604B, and 604C to be filled exactly. FIG. 18C shows the final result once the fill button 608 is depressed by the user. While in this example the numbers $R_1, \ldots, R_k$ are expressed as percentages, the artisan will appreciate that these numbers may likewise be expressed as fractions, decimals, or without any symbols (e.g., the user may simply evaluate the valve 606 to discern the relative size of the valve regions). While not expressly shown in the figures, the correspondence between the valve regions 620A, 620B, and 620C to the output tanks 604A, 604B, and 604C, respectively, may be indicated by color coding, numeric indicia, or other appropriate means.

Proportions problems of the general nature discussed herein may provide a proven and effective way to develop an understanding of, and a facility to manipulate, fractions, and proportions in a variety of settings. Thus, by playing such games, e.g., the ones shown in FIGS. 16A-16C and 17A-17F, and 18A-18C, the user may get a deeper understanding of fractions and proportions. Applicant's research has confirmed that this is indeed the case. The particular proportions problems may be formulated specifically to facilitate the construction of a physical or digital device that provides a learning experience that breaks the symbol barrier. In some embodiments, instead of exactly filling the output tanks, the puzzle may be solved by spilling the one or more output tanks by a particular amount (or by no more than a specified amount). Such may help develop the understanding of proportions to include estimation skills.

While FIGS. 16A-16C, 17A-17F and 18A-18B show that the adjustable valve is generally circular, such is merely exemplary, and the valve (and the regions thereof formed by the arms) may be rectangular, square, or take on other regular or irregular shapes. Similarly, the valve arms may extend radially as shown (akin to the hands of a clock), but may extend vertically, horizontally, or in other directions in other embodiments.

Figure 19:
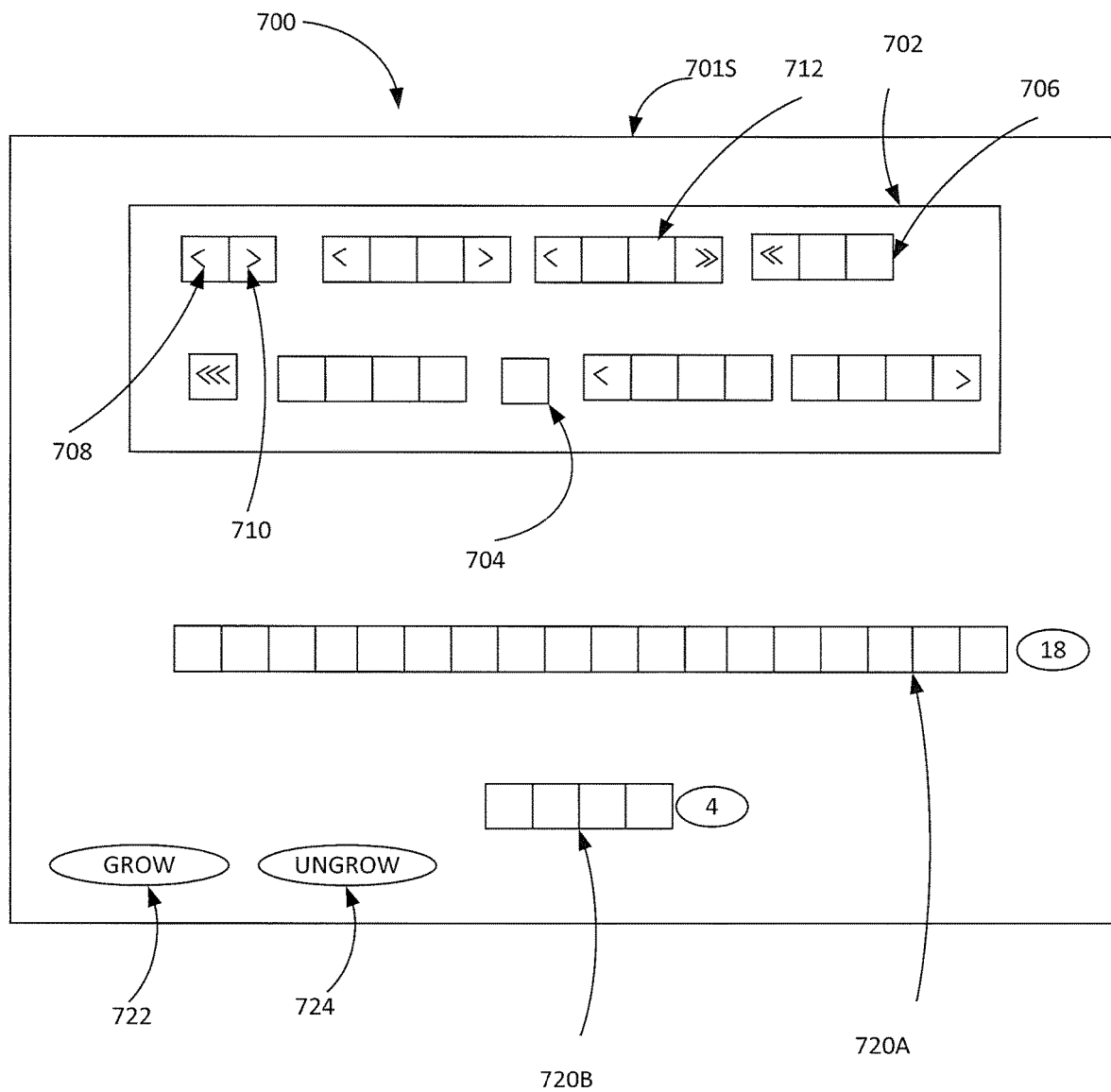
FIG. 19 is a schematic representation of yet another example of a physical input entry device of the system of FIG. 13, here a tiles instructional system, in an embodiment.

FIG. 19 shows yet another embodiment 700 of the input entry device 134. The input entry device 700 may, like the other input entry devices 134 disclosed herein, be a physical device that is communicatively coupled to the structure 102. Alternately, the input entry device 700 (and the other input entry devices) may be implemented digitally, e.g., via a graphical user interface and machine readable instructions. The input entry device 700 may be directed to presenting and solving simultaneous linear equations in a single unknown, with the intention of developing a deep and productive understanding of linear growth functions. The input entry device 700 may also provide exercise in spatial reasoning. The artisan will understand from the disclosure herein that linear growth is a ubiquitous phenomenon in many walks of life, and that assisting people in developing an understanding of linear growth can accordingly play a major role in mathematics education.

The disclosure relating to the input entry device 700 includes a method for representing and solving a problem involving a linear growth function and simultaneous linear equations in a single unknown. The primary objective of the input entry device 700 is not to demonstrate to users how systems of linear equations may be solved by hand. Rather, in embodiments, a primary objective of the input entry device 700 may be to cultivate in users a meaningful understanding of linear growth and to allow them to reason successfully about linear growth situations. Linear growth lends itself to instantiation in a simple mechanical device. The disclosure incorporates an element of engaging, challenging spatial reasoning that may provide a visualization of the growth.

Linear equations may normally be written in the symbolic algebraic form: y=ax+b, where x is an input variable, y an output variable, and a, b are constants. They can be viewed both statically and dynamically.

Viewed statically, linear equations may capture a specific relation between two numbers. For example, for the equation y=3x+4, the equation says what when x=7, then y=25, so the equation outlines a relationship between 7 and 25. In other words, the equation specifies an algorithm that, given a number x, produces a number y.

Viewed dynamically, a linear equation may specify a function. One common way to represent the function defined by the equation y=ax+b is by drawing its graph. While effective, the graphical representation may obscure the inherently dynamic, procedural aspect of a function. The input entry device 700 may provide an alternative representation of such a function that brings out the dynamic feature, drawing the user's attention to the growth-pattern of the function.

Focus on the growth pattern of linear functions may be achieved by representing the function in terms of small tiles or blocks that have pre-specified linear growth patterns. Of course, the tiles may take on other regular or irregular shapes. The input entry device 700 may also be referred to herein as a tile or block instructional system 700.

In more detail, the tile instructional system 700 may include a support structure 701S onto which one or more remaining components of the device 700 may be situated. The device 700 may include an input tray 702. The input tray 702 may comprise one or more individual movable tiles (or blocks) 704 and/or movable tile sections 706. Each tile section 706 may comprise a plurality of individual tiles 704 that are grouped together.

One or more of the tiles 704 (i.e., one or more of the individual tiles 704 and/or one or more of the tiles 704 forming the tile sections 706) may include a growth rule. The growth rule may be indicated by, e.g., Chevron markings or other indicia. For example, as shown in FIG. 19, a tile may have a left chevron marking 708 or a right chevron marking 710. The term "chevron marking", as used herein, includes any marking that indicates a direction, such as a left arrow, a right arrowhead, etc. The chevron markings 708, 710, when provided on tile sections 706, may be provided on the leftmost and/or the rightmost tile 704 of that section 706. As shown in FIG. 19, some tiles 704 may be devoid of any growth functions (indicated here by chevron markings) and other tiles 704 may include a plurality of chevron markings.

Each chevron marking may indicate a growth rule. For example, a solitary left chevron marking 708 on a tile 704 may indicate that the particular tile 704 can grow a tile to the left. For example, when the growth function is invoked on a solitary tile 704 having a left chevron marking, that tile 704 may grow a tile to the left and become a two tile section. A solitary right chevron marking 710 on a tile 704 may indicate that the particular tile 704 can grow a tile to the right. For example, when the growth function is invoked on a solitary tile 704 having a right chevron marking, that tile 704 may grow a tile to the right and become a two tile section.

As shown in FIG. 19, some tiles sections 706 may have each of a left chevron marking and a right chevron marking; for example, the right most tile of a tile section 706 may have a right chevron marking, and the left most tile of a tile section 706 may have a left chevron marking. When the growth function is invoked, the right most tile may grow a tile to its right and the left most tile may grow a tile to its left. That is, on initiating a move (e.g., a Grow move), each tile 704 with a chevron marking may expand in the direction of the chevron and the expansion thereof may correspond to the number of chevrons associated therewith. For example, the particular tile section 712 which is shown as having four tiles 704 may, upon invocation of the grow move, initially expand one unit square to the left and two unit squares to the right to form a tile section having an overall length of 7 unit squares, with a single left chevron pointed at its leftmost end and a double right-pointed chevron at its right most end. This expanded tile, once expanded, may be expanded yet again via a second Grow move that will cause this tile section to have an overall length of 10 unit squares. And so on. A tile having no chevron marking, conversely, may not grow as it does not have growth markings thereon.

Invocation of the growth function may be effectuated in the physical domain (e.g., mechanically) or virtually. For example, in physical embodiments, each tile with a chevron marking may have one or more additional tiles stacked atop the lowermost tile, and one or more of these tiles may be configured to extend outward (i.e., to the left or to the right depending on the chevron marking) when the Grow move (or growth function) is invoked. In one embodiment, one or more of the tiles stacked above the lowermost tile may be spring loaded and may be configured to extend to the left or the right by the force of a spring when the growth function is invoked. In another embodiment, powered (e.g., battery operated) arms may be used to cause a tile to extend to the left or the right of another tile. In another embodiment still, the tiles may be nested (akin to Russian dolls) within each other and may be pushed out using mechanical means when the growth function is invoked.

The tile instructional system 700 may further include one or more tile beds, such as tile beds 720A, 720B. Each tile bed 720A and 720B may include a label indicating the total number of unit tile receiving slots in that bed (e.g., 18 and 4 in beds 720A and 720B, respectively). In another embodiment, each tile receiving slot in each tile bed may be numbered to assist the user 136 in the determination of a solution.

The goal of the user 136 solving the linear growth problem presented by the device 700 may be to take the appropriate tile(s) and/or tile beds from the input tray 702 and position them in the tile beds 720A and 720B in such a way that, by invoking a minimum number of Grow moves, all tile beds are filled exactly (with no overlapping). Activation of a Grow move may cause all tiles that have been placed in a bed to grow according to their specified growth rule. There may be any number of trays and/or tile beds. The device 700 may provide a mechanism for solving simultaneous linear equations, with a focus on mathematical growth rules (functions), as discussed herein. In this example, the optimal solution may be of two forms: fewest number of applications of the Grow move and fewest number of tiles used. If the user 136 determines an optimal solution to a problem, a different (more complex problem from the same or a different topic) may be presented to the user 136.

Alternately, if the user 136 is unable to determine the optimal solution, a different (e.g., a less complex problem from the same topic) may be presented to the user 136. In this way, thus, the input entry device 134 may allow the system 100 to educate the user 136 while ensuring that the user 136 remains within his or her ZPD.

In embodiments, the device 700 may include an activator or binary switch, such as a grow button 722, which, when activated, may cause the tiles and tile sections to expand in accordance with their respective growth functions. In physical embodiments, the grow button 722 may be communicatively coupled to the tile sections (e.g., using RF or other network). In other embodiments, the growth function of a tile and/or tile section may be activated by interacting with (e.g., depressing) the chevron marking thereon. In some embodiments, a deactivator (such as an 'ungrow' or undo button 724) may be provided to reverse a grow move. The tile instructional system 700 may, in embodiments, be modular to allow for different puzzles to be presented to the user 136 (e.g., a tile bed may be replaced with a differently sized tile bed, a tile section may be replaced with a differently sized and/or marked tile section, etc.). As discussed above, the puzzles may increase or decrease in complexity depending on user progress. In embodiments, a guide having a plurality of linear growth problems of various difficulties may be provided so that the user 136 and/or another (e.g., an educator) may configure the device 700 to present and solve different problems. A similar guide may likewise be provided in association with the other input devices discussed herein.

Figure 20A:
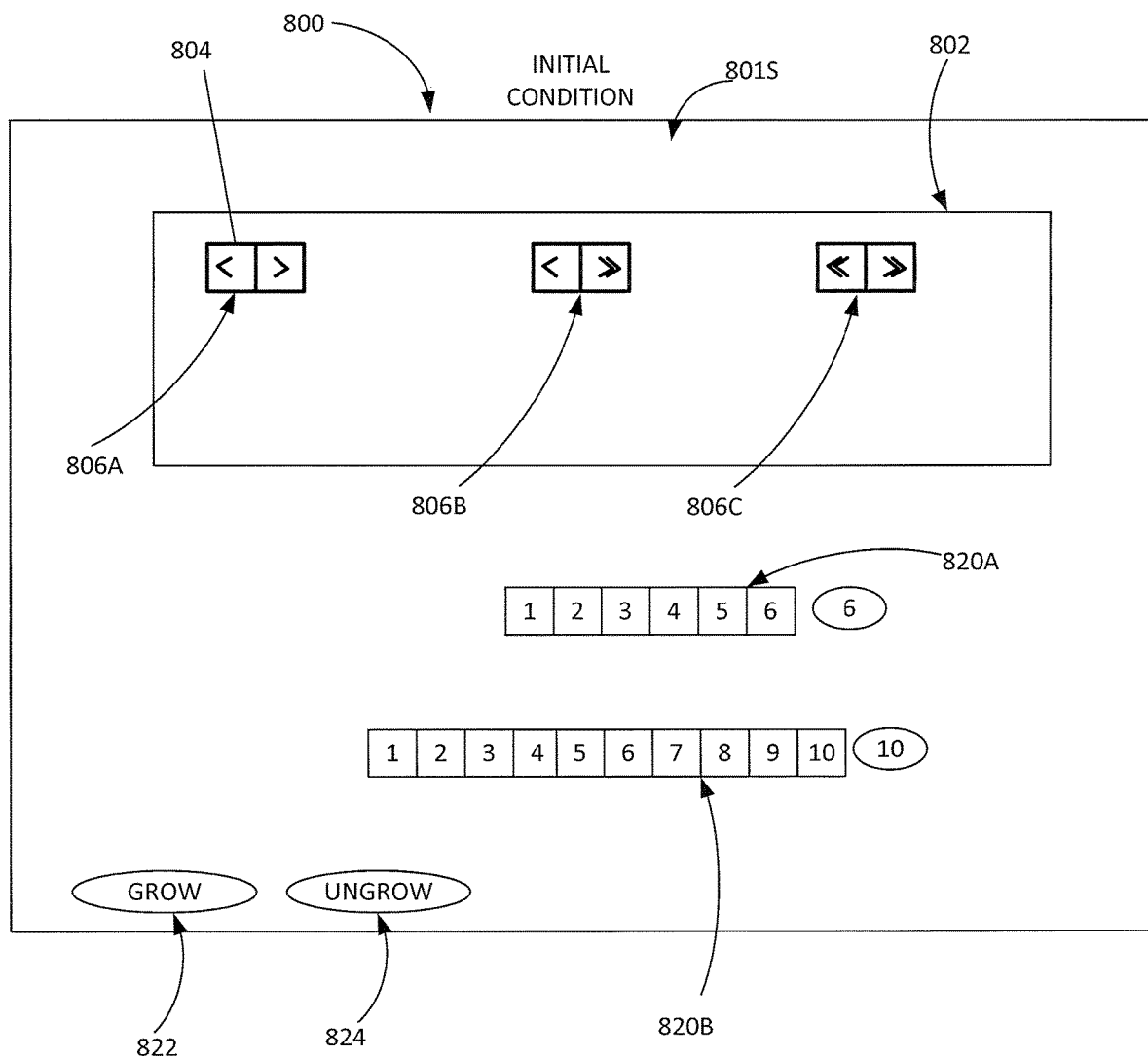
FIGS. 20A-20D illustrates a linear growth problem being represented and solved using the tiles instructional system of FIG. 19.

FIG. 20A shows an example tile instructional system 800 for educating users about linear growth functions. The tile instructional system 800 is substantially similar to the tile instructional system 700, except as specifically noted and/or shown, or as would be inherent. Further, those skilled in the art will appreciate that the embodiment 800 (and thus the embodiment 700) may be modified in various ways, such as through incorporating all or part of any of the various described embodiments, for example. For uniformity and brevity, corresponding reference numbers may be used to indicate corresponding parts, though with any noted deviations (for example, the input tray is designated 702 in FIGS. 19 and 802 in FIG. 20A). The artisan will appreciate from the disclosure herein that the configuration of the tile instructional system 800 is one of the many possible configurations of the tile instructional system 700. In embodiments, the tile instructional system 800 is an example of the tile instructional system 700.

As can be seen, the device 800 has in its input tray 802 three tile sections 806A, 806B, and 806C each comprising individual tiles 804. In this example, each of the tile sections 806A, 806B, and 806C have two individual tiles 804. In the tile section 806A, one tile has a left chevron marking and the other tile has a right chevron marking. In the tile section 806B, the left tile has a left chevron marking and the right tile has two right chevron markings. In the tile section 806C, the left tile has two left chevron markings and the right tile has two right chevron markings. As discussed above, when the Grow move is initiated (e.g., using the grow button 822), each tile may expand in accordance with the chevron markings thereon. The tile instructional system 800 further includes two tile beds 820A and 820B. As shown, each tile of each tile bed may be numbered, though such is not required in all embodiments. The tile bed 820A has 6 tiles and the tile bed 820B has 10 tiles. Of course, a different number and configuration of tiles and/or tile sections may be provided in the input tray and/or a different number and configuration of tile beds may likewise be provided.

Figure 20B:
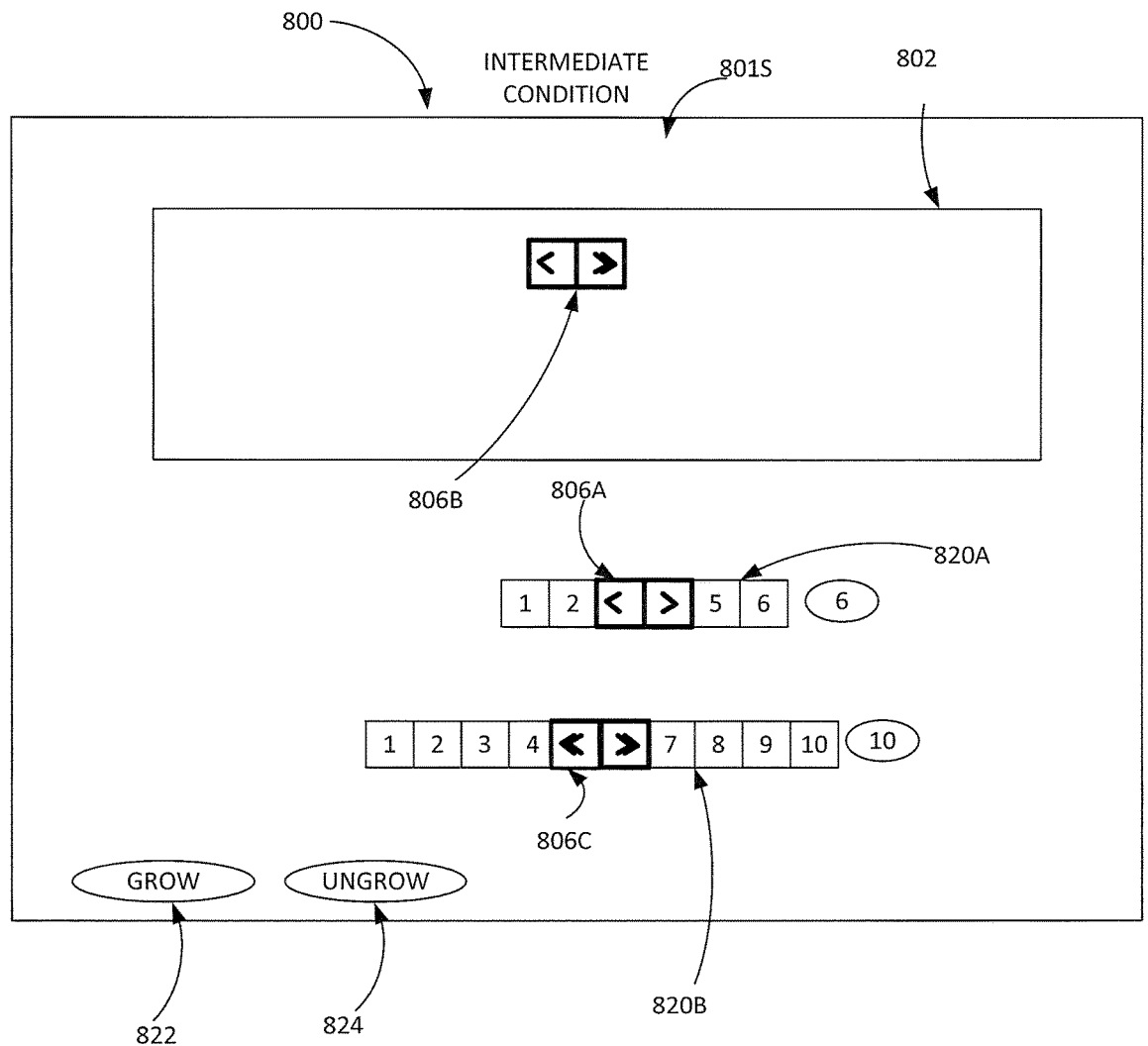

It will be appreciated that FIG. 20A shows the tile instructional device 800 in an initial condition (i.e., presenting a linear growth problem to the user 136). FIG. 20B shows the tile instructional device 800 in an intermediate condition (i.e., where the user has placed at least one of the tile sections 806A, 806B, and 806C into each of the tile beds 820A and 820B). Specifically, as can be seen, the user 136 has placed the tile section 806A in the tile bed 820A such that it covers the third and the fourth tile receiving slot of the tile bed 820A. The user 136 has further placed the tile section 806C in the tile bed 820B such that it covers the fifth and the sixth tile receiving slot of the tile bed 820B.

Figure 20C:
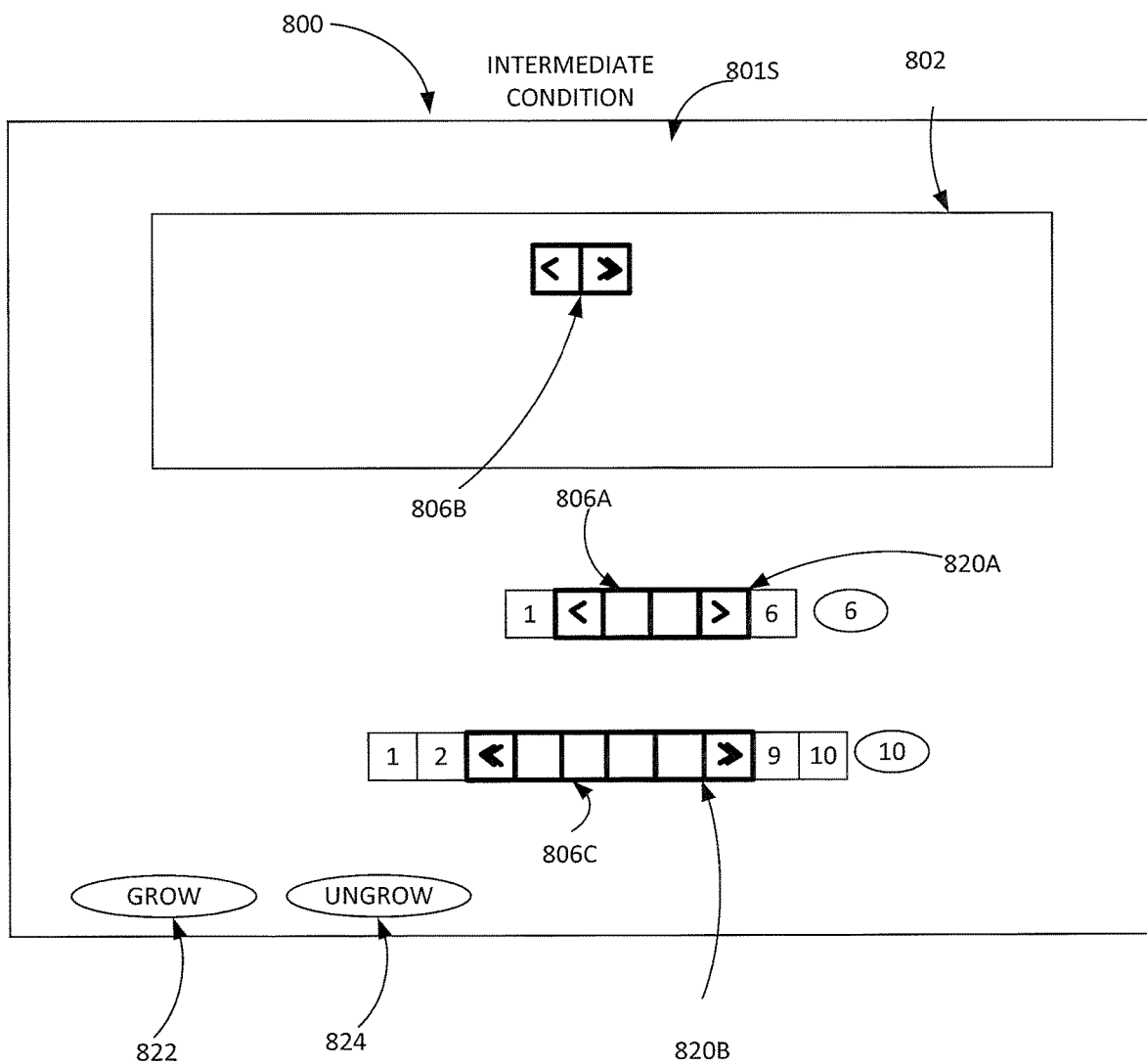

FIG. 20C shows the tile instructional device 800 in another intermediate condition (i.e., after the user has activated one Grow move). As can be seen, in response to the Grow move, the tile section 806A has grown from two tiles to four tiles, and more specifically, the tile section 806A has expanded one tile to the left and one tile to the right such that it now covers slots 2, 3, 4, and 5 of the bed 820A. The chevron markings continue to be on the outermost tiles, but the left chevron marking is now on the tile of the tile section 806A that corresponds to slot number 2 of the bed 820A, and the right chevron marking is now on the tile of the tile section 806A that corresponds to slot number 5 of the bed 820A. The tile bed 820B has likewise expanded in response to the activation of the Grow move. However, as can be seen, because originally each of the two tiles of the tile section 806C has two chevron markings each, the tile section 806C has expanded from two tiles to six tiles.

Figure 20D:
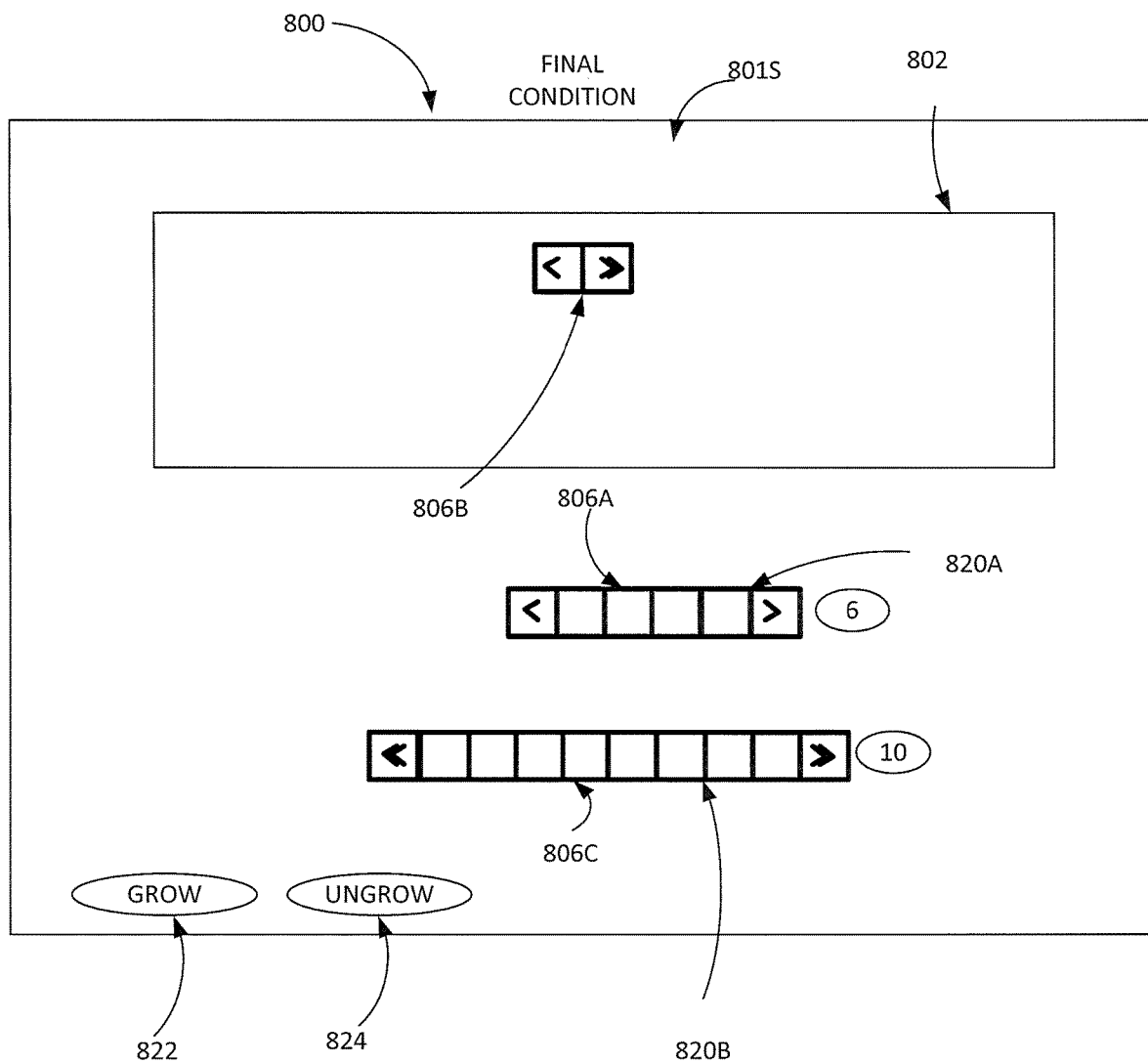

FIG. 20D shows the tile instructional device 800 in the final condition (i.e., after the user has initiated the Grow move a second time to fill each tile bed 820A and 820B exactly). Once the user initiates another Grow move, the tile section 806A expands from four tiles (as shown in FIG. 20A) to six tiles to fill the tile bed 820A. Similarly, once the user initiates another Grow move, the tile section 806B expands from six tiles (as shown in FIG. 20A) to ten tiles to fill the tile bed 820B.

The artisan will understand from the disclosure herein that the tiles are representations of linear equations. Unlike the gears system disclosed above, where the focus is on solving equations in several variables, with tiles the focus is on linear functions as a way to describe growth processes. An element of spatial reasoning is also incorporated in the positioning of the tiles and tile sections. FIG. 21 shows some example growth rules, i.e., example tiles and tile sections and linear functions corresponding thereto. The examples in FIG. 21 are not exhaustive and are not meant to be independently limiting.

The artisan will understand that while the disclosure focuses on a physical input entry device 134 usable by the user 136 to provide inputs that are then captured and evaluated by the structure 102, that in other embodiments, the input entry device 134 may be provided as software with which the user 136 may interact via conventional means (e.g., via a keyboard and mouse, etc.). For example, an interactive graphical user interface may comprise the gears system shown in FIG. 14, the liquid flow system shown in FIGS. 15, 16A-16C, 17A-17F and 18A-18B, the tiles system shown in FIGS. 19 and 20A-20C, etc., and the user may interact with these systems using conventional computer means (e.g., via a keyboard, a mouse, or other controller). However, in some embodiments, it may be preferable to use the physical input entry device 134 at least because the real-world experience provided thereby may be more memorable for the user 136 (as compared to pressing the keys of a keyboard and/or moving the mouse to cause virtual gears on the screen to rotate in like fashion).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps described herein and/or listed in the various figures need be carried out or need to be carried out in the specific order described.

The disclosure claimed is:

1. A computer-implemented method of representing a mathematical problem configured to educate a user on linear growth functions, said method comprising:
    providing a graphical user interface for displaying an instructional system, said instructional system comprising:
        an input area comprising a tile section, said tile section initially comprising at least two tiles and having associated therewith a growth rule, a number of tiles in said tile section configured to increase in accordance with said growth rule;
        an output area having a predefined number of tile receiving regions, said tile section being selectively movable by said user to a location at said output area; and
        a switch for causing said tile section to grow in accordance with said growth rule after said tile section has been moved to said location;
    receiving said tile section from said input area to said output area based on user selection of said location; and
    simulating growth of said tile section in accordance with said growth rule upon activation of said switch by said user;
    wherein, said mathematical problem is solved when a final number of tiles in said tile section equals said predefined number of tile receiving regions.

2. The method of claim 1, wherein said tile section comprises a plurality of tile sections.

3. The method of claim 2, wherein said user is required to select an appropriate tile section from said plurality of tile sections.

4. The method of claim 1, wherein said switch is activated by said user a plurality of times to solve said mathematical problem.

5. The method of claim 1, wherein each of said at least two tiles in said tile section grows a different number of tiles upon activation of said switch.

6. The method of claim 1, wherein said growth rule represents a linear equation.

7. The method of claim 1, wherein said output area comprises a plurality of output trays, each of said plurality of output trays having a predefined number of tile receiving regions.

8. The method of claim 1, further comprising representing a new mathematical problem based on an evaluation of user inputs.

9. A computer-implemented method of representing a mathematical problem, comprising:
    providing a graphical user interface for displaying an instructional system, said instructional system comprising:
        an input area comprising a tile section, said tile section having a growth rule associated therewith;
        an output area having a predefined number of tile receiving regions; and
        a switch for causing said tile section to grow in accordance with said growth rule;
    receiving said tile section from said input area to said output area based on an input from a user;
    simulating growth of said tile section based on said growth rule upon activation of said switch;
    wherein, said mathematical problem is solved when a final number of tiles in said tile section equals said predefined number of tile receiving regions.

10. The method of claim 9, wherein said growth pattern is indicated on said tile section by chevron markings.

11. The method of claim 9, further comprising providing a plurality of output trays in said output area.

12. The method of claim 9, wherein said tile section comprises a plurality of tile sections.

13. The method of claim 12, wherein said user is required to select an appropriate tile section from said plurality of tile sections.

14. The method of claim 9, wherein said switch is activated by said user a plurality of times to solve said mathematical problem.

15. The method of claim 9, wherein said growth rule represents a linear equation.

16. The method of claim 15, wherein said linear equation contains a single unknown.

17. A computer-implemented method of representing a mathematical problem, comprising:
    providing a graphical user interface for displaying an instructional system, said instructional system comprising:
        an input area comprising a tile section, said tile section having a growth rule associated therewith;
        an output area having a predefined number of tile receiving regions;
        a switch for causing said tile section to grow in accordance with said growth rule;
    receiving said tile section from said input area to said output area based on an input from a user;
    simulating growth of said tile section based on said growth rule upon activation of said switch;
    wherein, said mathematical problem is solved when a final number of tiles in said tile section equals said predefined number of tile receiving regions.

18. The computer-implemented method of claim 17, wherein said tile section comprises a plurality of tiles.

19. The computer-implemented method of claim 18, wherein one of said plurality of tiles grows disparately from another of said plurality of tiles.

\* \* \* \* \*